US008515397B2

(12) United States Patent
Gatti et al.

(10) Patent No.: US 8,515,397 B2
(45) Date of Patent: Aug. 20, 2013

(54) TIME AND LOCATION BASED THEME OF MOBILE TELEPHONES

(75) Inventors: John M. Gatti, San Diego, CA (US); Michael Vines, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 911 days.

(21) Appl. No.: 11/963,988

(22) Filed: Dec. 24, 2007

(65) Prior Publication Data

US 2009/0163182 A1 Jun. 25, 2009

(51) Int. Cl.
H04M 3/42 (2006.01)

(52) U.S. Cl.
USPC ............... 455/414.1; 455/414.3; 455/456.1; 455/456.3; 340/539.13; 379/888.24

(58) Field of Classification Search
USPC 455/414.1, 456.1, 414.3, 456.3; 340/539.13; 379/88.24
See application file for complete search history.

(56) References Cited

U.S. PATENT DOCUMENTS

| | | | |
|---|---|---|---|
| 6,831,970 | B1 | 12/2004 | Awada et al. |
| 6,836,651 | B2 * | 12/2004 | Segal et al. ............... 455/405 |
| 7,221,939 | B2 | 5/2007 | Ylitalo et al. |
| 7,224,963 | B2 * | 5/2007 | Anderson et al. ......... 455/414.3 |
| 2002/0142792 | A1 | 10/2002 | Martinez |
| 2007/0208880 | A1 * | 9/2007 | Lauper et al. ............ 709/246 |

FOREIGN PATENT DOCUMENTS

| | | |
|---|---|---|
| CN | 1399850 A | 2/2003 |
| CN | 101088271 A | 12/2007 |
| EP | 1804539 A1 | 7/2007 |
| GB | 2362786 | 11/2001 |
| JP | 2003209598 A | 7/2003 |
| JP | 2003529235 | 9/2003 |
| JP | 2003283702 A | 10/2003 |
| JP | 2007150487 A * | 6/2007 |
| JP | 2007166610 A | 6/2007 |
| JP | 2007536769 T | 12/2007 |
| WO | WO0117297 | 3/2001 |
| WO | WO0182065 A2 | 11/2001 |
| WO | WO2005039160 | 4/2005 |

OTHER PUBLICATIONS

International Search Report and Written Opinion—PCT/US2008/088284, International Search Authority—European Patent Office—Nov. 3, 2009.
European Search Report—EP08102986—Search Authority—Munich—Feb. 5, 2009.

* cited by examiner

Primary Examiner — Amancio Gonzalez
(74) Attorney, Agent, or Firm — James T. Hagler

(57) ABSTRACT

A cellular or wireless mobile handset includes a processor configured with software to monitor time, date, location and other parameters, and change customization settings, known as themes, based upon the monitored parameter. Multiple themes may be stored on the mobile handset and implemented by the mobile handset processor based upon a variety of circumstances. A theme server may be accessed by the mobile handset to download theme settings and files. Working together, mobile handsets and a theme server can provide location-specific as well as time/date specific themes to mobile handsets.

21 Claims, 21 Drawing Sheets

| DB Key | Theme File Name | Wallpaper | General Ring Tone | Special Ring Tone | Speed Dial Setting |
|---|---|---|---|---|---|
| 1 | Work | Company logo | Standard | Standard | Work # |
| 2 | After hours | Personal | Custom 1 | Custom 2 | Friends |
| 3 | Night time | - | Silent | Quiet | Emergency |
| 4 | Weekend | Favorite pics | Custom 1 | Custom 3 | Friends |
| 5 | Conservative | Plain | Quiet standard | Vibrate | - |
| 6 | Silent | Plain | Vibrate | Vibrate | Emergency |
| 7 | Baseball | Team Logo | Fight Song | Vibrate + song | Friends |
| 8 | Download | Download | Download | Custom 2 | Download |

FIG. 17

TIME AND LOCATION BASED THEME OF MOBILE TELEPHONES

FIELD OF THE INVENTION

The present invention relates to cellular telephone handset devices, and more particularly to a mobile handset devices configured to exhibit user preferences based upon a time, location and/or other parameters.

BACKGROUND

Owners of cellular telephones typically customize their handsets by selecting ring tones, display images, and button tones. Displays presented on the mobile handset display are referred to as wallpaper, and the collection of wallpaper, ring tones, button tone settings, etc. are referred to as themes or theming. Customization settings can also include speed dial settings, the icons displayed to indicate different information and functions, and even the function associated with individual buttons.

To customize a mobile handset, the user must designate an image saved in memory as the image to be used as wallpaper, designate audio files to be used for ring tones for general and special callers, customize key tones and button settings, and associate telephone numbers with speed dial buttons. This can be a time consuming process, and thus most users do not change their customizations settings on a regular basis.

Often the collection of wallpaper, ring tones and button tones are organized around a theme, such as a favorite recording artist, athlete, location or subject matter (and thus the reference to such settings as "themes"). Such themes may be professional, such as displaying the name or trademark of the user's company, or personal, such as images/voices of loved ones, or favorite athlete, actor or recording artist. While personalized handsets improve a user's experience, some themes may not be appropriate in all environments. For example, personal themes may be inappropriate at work. Similarly, theme settings appropriate for work, such as speed dial settings and ring tones may be undesirable after work hours.

SUMMARY

The various embodiments provide methods for changing themes on handsets based upon time, date, location, event and/or other parameter. A mobile handset can be configured with software to determine when a change in the customization theme should be made, and execute the change automatically. The mobile handset can determine the appropriate theme, recall the theme settings in memory, and implement the theme transformations using recalled theme settings and files. In some embodiments, the mobile handset can download a theme data record from a theme server, and implement the theme transformations using the settings and files in the downloaded record. Embodiments include a theme server that is configured to send theme records to mobile handsets, including determining when a theme record should be sent to a particular mobile handset based upon time, date or a reported location.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 17 is a diagram of a theme database data structure suitable for use with various embodiments.

DETAILED DESCRIPTION

Figure 1:
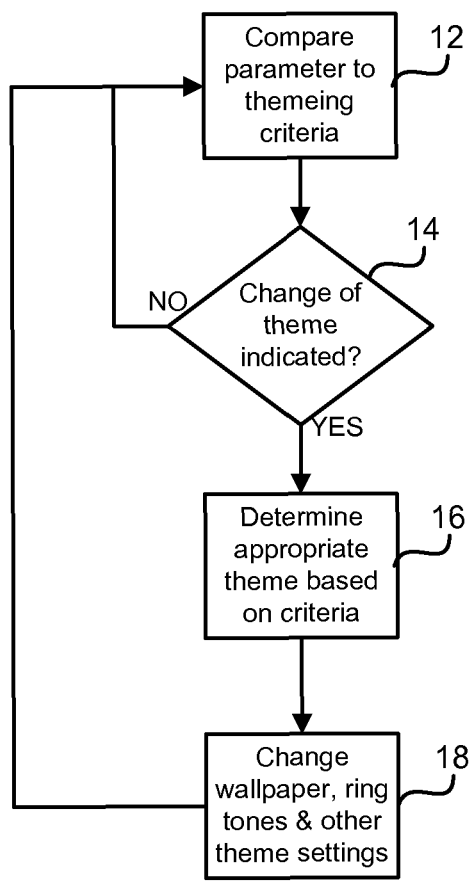
FIG. 1 is a process flow diagram illustrating an overview process according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "handset" and "handheld device" refer to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the iPhone®), and similar personal electronic devices which include a programmable processor and memory. In a preferred embodiment, the mobile handset is a cellular handheld device that can communicate via a cellular telephone network (e.g., a cellphone). However, cellular telephone communication capability is not necessary in all embodiments. Moreover, wireless data communication may be achieved by the handheld device connecting to a wireless data network (e.g., a WiFi network) instead of a cellular telephone network.

As used herein, the term "theme" refers to the collection of user-configurable settings that may be implemented on a mobile handset to personalize the mobile handset to the user's preferences. A theme is defined by the files and settings used for any and all of the wallpaper (i.e., images presented on the mobile handset display), ring tones (i.e., audio files triggered by different events), ring settings (e.g., loud, medium, soft and silent, as well as vibrate mode), button tones (i.e., tones played when buttons are pressed), button functions, display icons, and speed dial settings (i.e., the telephone number associated with each button configured for speed dialing). A theme may also include settings for other user-configurable settings like password protections, keypad locks, carrier selections, etc. Composed of such data, a theme can be stored as a mix of files (e.g., image and audio files), as well as configuration data (e.g., telephone numbers associated with particular speed dial buttons). Alternatively, a theme can be stored as memory pointers to or a file names of the image and data files comprising the theme, such as a pointer to or the name of an image file (such as a .jpg file) for use as the wallpaper, a pointer to or the name of an audio file (such as a .wav file) to use to announce incoming phone calls (i.e., the ring tone), a pointer to or name of a data file containing speed dial designations, etc. As is well known in the computer arts, a "pointer" refers to a data element which contains the memory address of a particular file, and thus it points a processor accessing the pointer to the location in memory of the indicated file.

While personalizing mobile handsets is a popular option used by many mobile handset owners, some personalization themes are not appropriate in all contexts. For example, personalizing a mobile handset with a theme-based on the image and voice of a girl friend or favorite actress may not be suitable when the user is in a professional setting, such as at work or while visiting customers. Other examples include having a whimsical ring-tone that may not be suitable in a professional setting. Similarly, personalization themes appropriate for professional settings may be less desirable when the user is relaxing or socializing with friends. For example, one might accidentally speed dial a professional contact while out at a noisy restaurant or nightclub. Current personalization software makes it time consuming to change the mobile handset theme. Also, changing the theme presented on the mobile handset requires user actions which may be impractical in many situations (e.g., while driving).

To overcome this disadvantage, the various embodiments provide capabilities by which a mobile handset can automatically change the theme, that is the wallpaper, ring tones, buttons and tones, speed dial settings, and other personalization features, based upon information available to the mobile handset, such as the time of day, day of week, calendar date and location. This capability allows users to save a number of themes with settings configured so that their mobile handset displays the appropriate theme at all times. These capabilities further enable additional practical applications to improve the user's experience and the functionality of their mobile handsets by presenting themes applicable to particular locations.

An overview of the various embodiment methods is illustrated in FIG. 1 which illustrates basic process steps that may be implemented on a mobile handset. In the various embodiments, a theme-change application running on the processor within the mobile handset compares a time/place/event parameter value to a criterion stored in memory for setting various criteria, step 12. Such parameter values include, but are not limited to, time, date, day of week, geographic coordinates (such as obtained by a GPS receiver), calendared events, incoming telephone calls, incoming SMS (simple message system) messages, the currently connected cellular service provider, movement (e.g., indicated by change in GPS coordinates), altitude (e.g., based on GPS coordinates), currently logged in user (e.g., determined by an entered password), battery condition, temperature, transceiver on/off status and combinations of two or more of such parameters. While the various embodiments are described with respect to time, date, location and event parameters, references to these parameters is for illustrative purposes only and are not intended to limit the scope of the claims.

The theme-change application uses one or more measured parameters to determine whether a change in theme is appropriate. This determination may be accomplished by comparing the measured parameter to a theme change criterion stored in memory. As discussed more fully below with reference to FIG. 16, a variety of parameters may be compared simultaneously to multiple theme change criteria to determine whether a theme change is appropriate. Such theme change criteria may be stored in a data table to facilitate setting and changing themes. This data table of theme change criteria is referred to as a "theme change criteria table." By allowing users to set and edit a variety of theme change criteria, a user's experience can be improved and greater flexibility may be provided to users to allow them to further customize their mobile handsets.

By comparing the measured parameter to a theme change criteria the theme change application running on the mobile handset processor can determine whether a change of theme is indicated, test 14. If no change of theme is indicated, the processor may continue to monitor measured parameters and compare them against theme change criteria. However, if a change of theme is indicated (i.e., test 14="YES"), the theme change application determines the appropriate theme based on the particular criteria matching the parameter, step 16. In the case where there are a number of different theme criteria, the particular criteria which matches the measured parameter can be used to select a particular theme setting dataset (which is also referred to herein as a "theme data record"). In this manner, a variety of different themes may be stored in the mobile handset memory for implementation when their associated theme change criteria are satisfied by a measured parameter.

Finally, using the selected theme setting dataset, the processor within the mobile handset implements the new theme's image and/or audio files and other settings to the memory of locations which control the mobile handset's wallpaper, ring tones, button tones, button functions, speed dial settings, etc., step 18. Depending upon the mobile handset design, this step involves copying a file or values stored in memory associated with various themes into the memory registers which are used by the mobile handset to control the display, audio signals, and button functions. Since the various embodiments store a variety of theme settings in memory, this replacement of theme settings in use on the mobile handset can be made frequently without losing any of the user's personalization settings.

Further description of details steps involved in accomplishing the method illustrated in FIG. 1 are described below with reference to the remaining figures.

Figure 2:
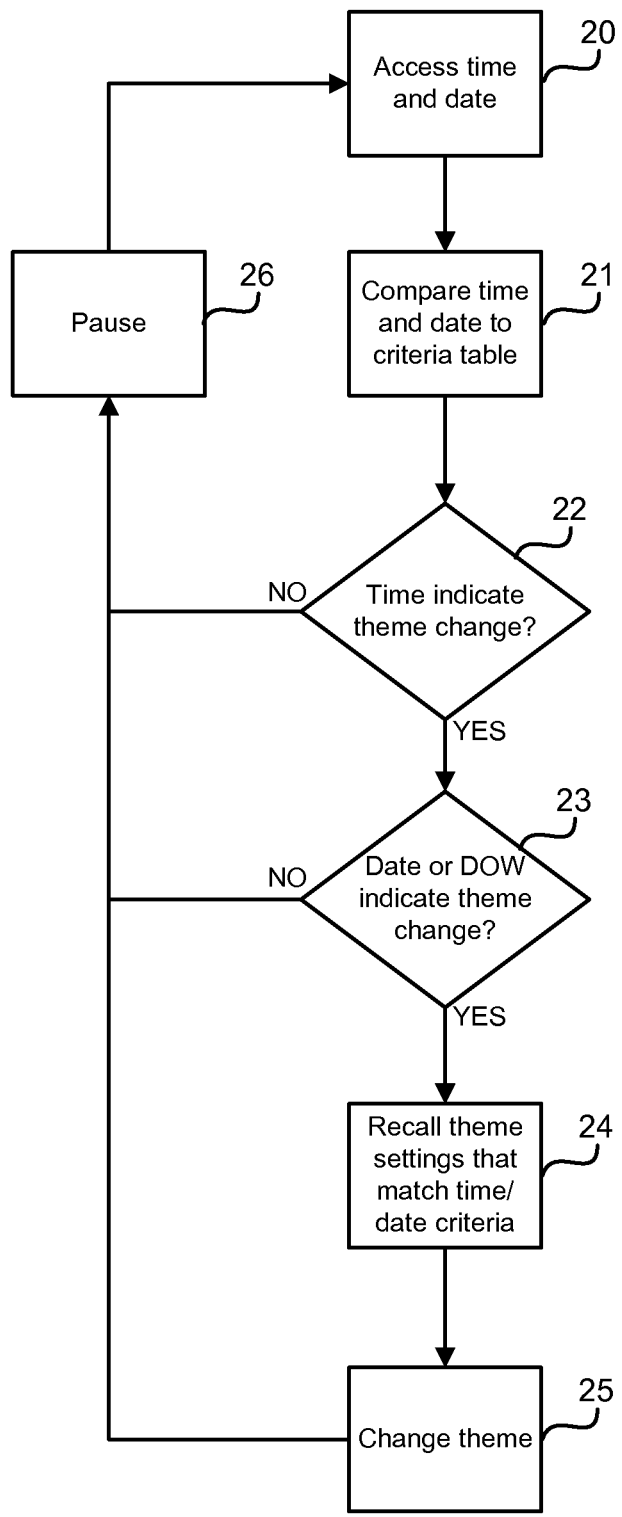
FIG. 2 is a process flow diagram of an embodiment method suitable for implementation on a mobile handset.

FIG. 2 illustrates an embodiment method by which the theme displayed on the mobile handset is changed depending upon the time and/or date. Since most mobile handsets include a clock and calendar function, a mobile handset processor can determine the time of day, day of week in calendar date by accessing memory where such values are stored, step 20. Using the current time and/or date, the theme change application can compare the time/date to criteria in a theme change criteria table to determine if any criteria are satisfied, step 21. For example, if a criterion for changing themes is that the time of day is after 6:00 PM, e.g., after work hours, and the measured parameter is 6:01 PM, a change in theme may be indicated. Thus, by comparing the time of day to the theme change criteria, step 21, the processor can determine whether a change of theme is indicated, test 22. If the current time does not match a theme criteria or if the presently implemented theme is the theme associated with the matched criteria, then no change in theme is indicated (i.e., test 22="NO"). However, if a theme criteria is satisfied and the presently implemented theme is not the theme associated with the matched criteria, then the theme change application may further test whether a date or a day of the week criteria for changing themes is satisfied, test 23. For example, a time of day criteria of 6:00 PM may be further limited to only day of week values equal to Monday through Friday. Thus if the 6:00 PM criteria is satisfied, but the day of week is Saturday, a different theme may be indicated, in which case the result of test 23 may be "NO." However, if the date or day of week criteria is also satisfied (i.e., test 23="YES"), then the theme change application may recall from memory (e.g., a theme data table) the theme settings and files which match the satisfied criteria, step 24. As discussed in more detailed below with reference to FIGS. 16 and 17, this step may involve recalling from memory data files which include an image file for use as the wallpaper, audio files for use in ring tones and button tones, and functional settings for use in customizing button functions and speed dial settings.

The theme change application then implements the various theme settings, step 25. This step, which is described in further detail below with reference to FIG. 18, may involve copying the recalled theme files and settings into the memory registers associated with the theme characteristics being changed.

If a theme setting does not need to be changed (i.e., step 22 or step 23="NO") or the theme has been changed (step 25), the theme change application may continue to monitor the time and date by returning to step 20. In order to avoid unnecessary processing which may drain the portable power source, the theme change application may be configured to pause for a period of time, step 26, before returning to step 20 to access the time and date again. For example, the theme change application may be configured to compare the time and date to theme change criteria every five minutes (i.e., the pause of step 26 equals five minutes). This step of pausing may be implemented as a countdown timer, periodic function call, or elapsed time measure which may be part of the clock functionality implemented within the mobile handset.

The embodiment illustrated in FIG. 2 provides users with the ability to have a variety of themes stored on their mobile handset which will be implemented at the appropriate time and day. Thus users can have a multitude of personalized images, ring tones and speed dial settings configurations with the mobile handset selecting the appropriate theme based on the time of day, day of the week or day of the year. For example, the mobile handset can automatically set a theme that is appropriate for nighttime when the user is most likely asleep. This night time theme may include, for example, setting the ring tones to silent except special ring tones for selected important numbers, and speed dial numbers set to the emergency numbers (e.g., 911) or phone numbers of individuals that might be called during the night.

Figure 3:
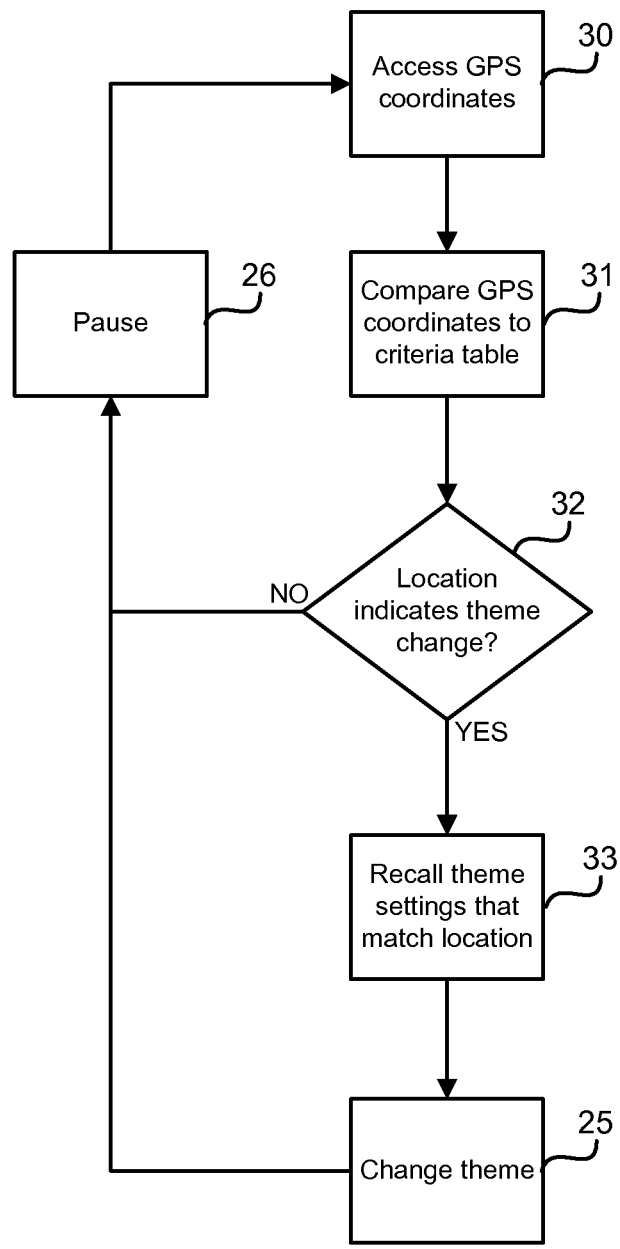
FIG. 3 is a process flow diagram of another embodiment method suitable for implementation on a mobile handset.

Another embodiment illustrated in FIG. 3 enables the mobile handset to automatically change the theme currently implemented depending upon the present location of the mobile handset. For example, a theme may be associated with the user's work location so that whenever the mobile handset is within the boundaries of the user's job site, a work appropriate theme is implemented. Then, after leaving the job site, the user's personal theme may be implemented. As a further example, the mobile handset may be configured to display a theme appropriate to particular locations such as a theme park, beach house, athletic facility (e.g., a football stadium), etc.

Many mobile handsets include a global positioning system (GPS) receiver or are capable of determining their location in coordination with cellular service providers, such as the Advanced Forward Link Trilateration (AFLT), Enhanced Forward Link Trilateration (EFLT), Enhanced Observed Time Difference of Arrival (EOTD) systems. Using such capabilities, the theme change application running on the processor in the mobile handset may be able to access geographic coordinates from a particular register in memory, step 30. These obtained coordinates may then be compared to a theme change criteria table to determine if any criteria match the current location, step 31. If the coordinates match a theme change criteria, the theme change application may determine whether the current location indicates a need for a theme change, test 32. For example, if the currently implemented theme is not consistent with the theme associated with the criteria, then a change of theme is indicated (i.e., step 32="YES"). In that case, the theme change application may recall from memory the theme setting values associated with the matching criteria, step 33. Then using these theme setting values and associated files (e.g., image and audio files), the theme change application can implement the theme change, step 25, as described in more detail below with reference to FIG. 18. As with the embodiment described above with reference to FIG. 2, the theme change application may pause, step 26, before accessing geographic coordinates again, step 30, to restart the loop illustrated in FIG. 3. Similarly, if the theme change application determines that no change in theme is indicated (i.e., test 32="NO"), then the theme change application may pause, step 26, before returning to the step of checking geographic coordinates, step 30.

The embodiment illustrated in FIG. 3 enables users to configure their mobile handsets with a variety of theme settings which will be implemented whenever the users are in particular locations. Location-specific theme settings have a variety of very useful applications. For example, a work appropriate theme may be implemented whenever the mobile handset is within range of the user's work site. A personal setting may be implemented whenever the user is in the vicinity of the user's home. A silent theme may be implemented whenever the mobile handset is in a location where mobile handset ringers should be turned off, such as in movie theaters, classrooms and places of worship. In this manner, the user can ensure that the mobile handset is properly configured for the particular location without having to reset ring tones or change theme settings manually.

Figure 4:
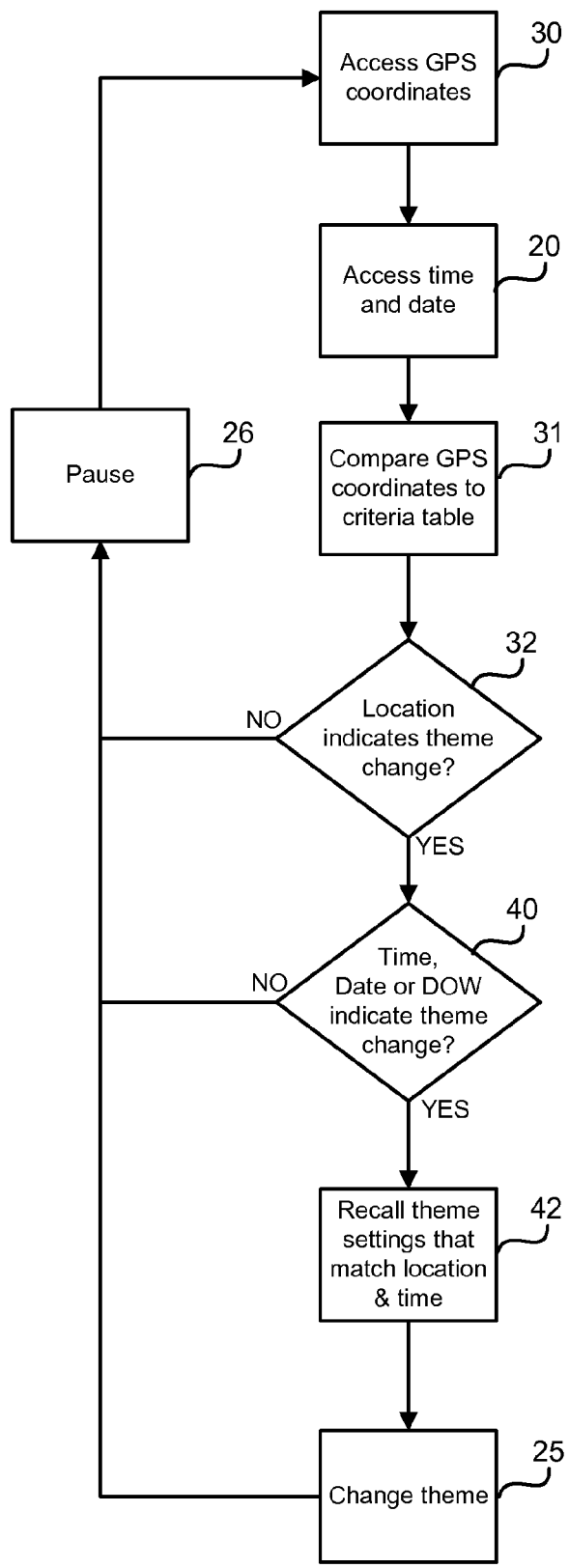
FIG. 4 is a process flow diagram of another embodiment method suitable for implementation on a mobile handset.

FIG. 4 illustrates an alternative embodiment which combines both time and location criteria for setting mobile handset themes. In this embodiment, a particular theme may be indicated as appropriate for a location at certain times of the day. For example, a work theme may be appropriate when the mobile handset is in the vicinity of the job site but only during normal working hours. As with the embodiments illustrated in FIGS. 2 and 3, the theme change application may access geographic coordinates from memory, step 30, and also access time and date values from memory, step 20. The theme change application then may compare the geographic coordinates to the theme change criteria to determine if any change criteria are associated with the coordinates, step 31. If the present coordinates match or are close to a location criteria in the theme change criteria table, then the theme change application may determine whether a change in theme is indicated, step 32. As discussed above with reference to FIG. 3, this test may include determining whether the presently displayed theme is the same as the theme associated with the matched criteria, and if it is, no change is required (i.e., test 32="NO"). If a change of theme is indicated in step 32, then the theme change application may compare the present time and date or day of week (DOW) to time and date or day of week criteria associated with the matching location criteria to determine if a theme change is indicated, step 40. This time, date and/or day of week criteria may be part of the same change criteria in the theme change criteria table or may be another criterion within the table. If the present time, date and/or day of week match a theme change criteria time, date and/or day of week, and the presently implemented theme is not the theme associated with the matched criteria, then a change of theme may be indicated (i.e., test 32="YES"), in which case the theme change application may recall the particular theme settings and files associated with the matched criteria, step 42. Then, using the recalled theme settings and files, the theme change application can change the implemented theme, step 25. As with the previously described embodiments, this process may be repeated in a loop with the theme change application returning to check geographic coordinates, step 30, after some pause for a period of time, step 26.

As with the embodiment described above with reference to FIG. 3, the embodiment illustrated in FIG. 4 permits a user to configure the mobile handset to display themes appropriate to particular locations as well as to particular times of day or days of the week. For example, a user may configure a mobile handset so that a school-appropriate theme is implemented when the mobile handset is in the vicinity of the user's school, except when the time of day is after school hours or the day of the week is a weekend, in which case the user's personal theme may be implemented.

Figure 5:
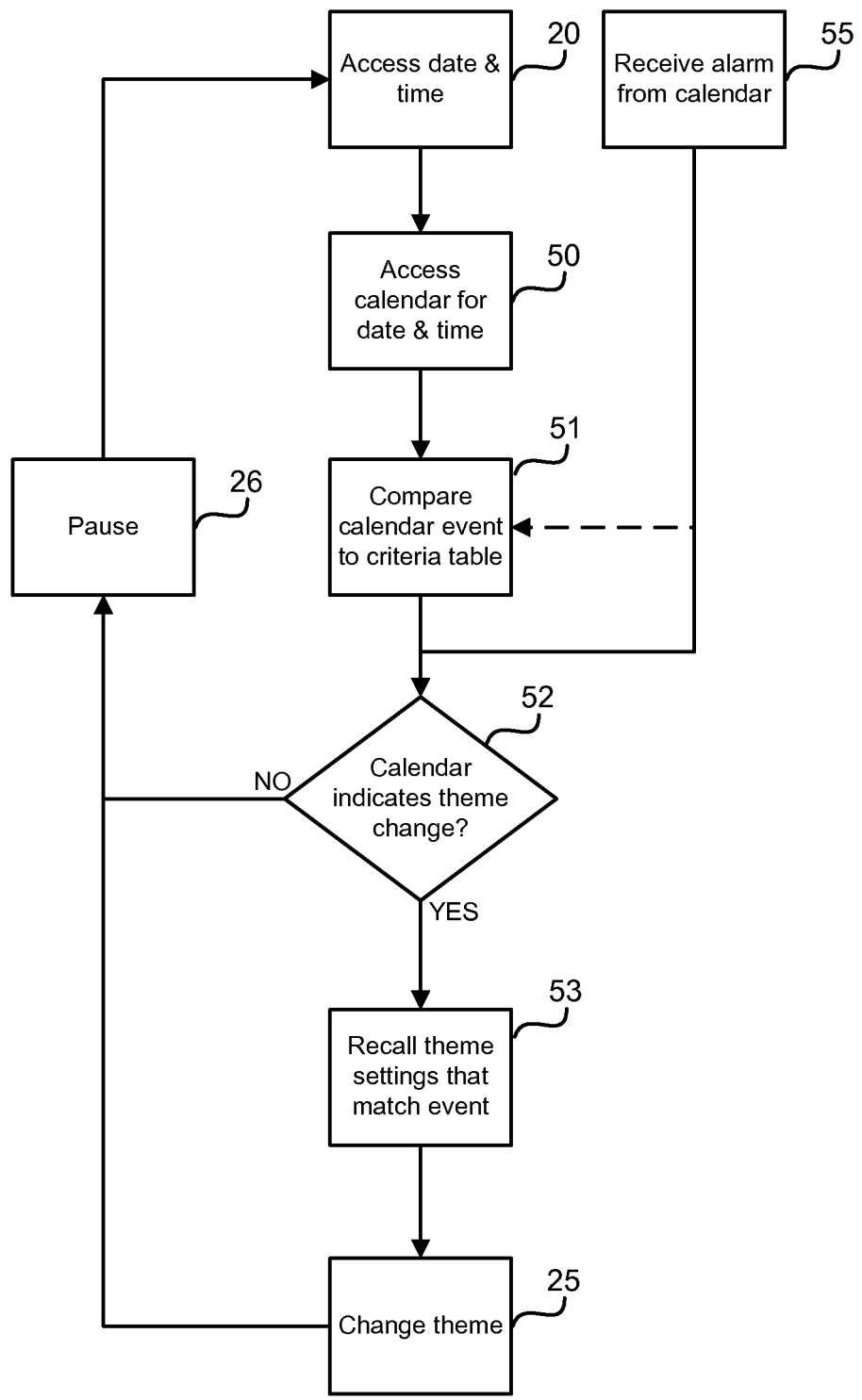
FIG. 5 is a process flow diagram of another embodiment method suitable for implementation on a mobile handset.

In addition to basing theme changes upon time and location, a further embodiment illustrated in FIG. 5 may change mobile handset themes based upon scheduled events recorded in a calendar program. Mobile handset users frequently store their appointments, personal schedules, travel plans and other events in an appointment or calendar applications running on their mobile handsets. The typical calendar application includes a database for storing dates and times of scheduled events, as well as options for notifying the user when an event is about to occur. Such notifications may be in the form of an audio alarm or flashing display. In the embodiment illustrated FIG. 5, the theme change application uses such an alarm or accesses the database of events or to enable event-based theme changes.

Referring to FIG. 5, the mobile handset theme change application may access the present time and date value stored in memory, step 20, and use the time and date values to access the calendar database to determine if there is an impending scheduled event which is close to the present time and date, step 50. If there is an impending event in the calendar database, the theme change application may compare the recorded event to events stored in the theme change criteria table to determine if a theme change may be appropriate, step 51. For example, not all events stored in a calendar database will warrant a change of theme. Reminders and routine notices associated with work or personal events that have no correlated theme settings may not require a theme change. On the other hand, certain events like meetings, travel plans, social events, and sporting events, may each be associated with different themes, and thus may be listed in the theme change criteria table.

If there is a change criteria associated with the calendared event, the theme change application may determine whether the presence of the event in the calendar indicates the need for a theme change, step 52. For example, if the event criteria is associated with theme settings that are presently implemented, no change of theme would be indicated (i.e., test 52="NO"). An example of such a situation is where the calendared event is a baseball game to which the theme change criteria table associates a sports team theme, but the sports team theme has already been implemented, such as based upon the mobile handset being in the vicinity of the ballpark (i.e., based upon geographic coordinates). In that situation, there would be no need to change the theme, so the result of test 52 would be "NO" and the theme change application would return to periodically comparing the present date and time against the calendar database (steps 26, 20, 50 and 51). However, if the event matches a criterion for changing themes and the new theme is not presently implemented (i.e., test 52="YES"), then the theme change application may recall from memory the theme settings correlated to the matched criterion, step 53. Finally, using the recalled theme settings, the theme change application can implement the new theme, step 25.

Since calendar applications typically include options for setting alarms, such as sounding a tone and/or triggering a display at the time of (or a selected time before) a calendared event, such alarms may also be used to trigger a theme change. Accordingly the theme change application may receive an alarm from the calendar application, step 55. Since the calendar application may be running on the same processor as the theme-changing application, this reception of an alarm may be a subroutine or application call, recognition of a flag or value set in memory, or a recognition that a particular action (e.g., as the sounding of the alarm) has been implemented.

Reception of the alarm, step 55, may trigger a theme change in at least two ways. In a first way illustrated by the dashed arrow in FIG. 5, the alarm may trigger a comparison of the event generating the alarm to the theme change criteria table, step 51. The theme change application then performs the steps as described above to determine if a theme change is indicated, step 52, and then implements a theme change, steps 53, 25. In a second way illustrated by the solid arrow, the alarm itself may be tied to theme settings, so that when the alarm is received (step 55) the associated theme settings are indicated, such as by a pointer to memory where the theme settings are stored. With the theme settings indicated by the alarm itself, there is no need to compare the event to the theme change criteria table (step 51), so the theme change application may determine if a theme change is required, step 52, such as by determining if the indicated theme is different from the presently implemented theme. If the indicated and implemented themes are different (i.e., test 52="YES"), the theme change application may recall the theme settings from memory, such as by using the theme file name or memory pointer associated with the alarm, step 53, before implementing the theme change, step 25.

Calendar-based theme changing can be quite useful for a number of situations. For example, a user may set a particular theme associated with a vacation which is recorded as an event in the calendar database. Thus, when it is time for vacation, the vacation theme may be implemented automatically. As another example, a user planning an airline flight, may include the airline, flight number and departure time in the calendar program and designate a theme which includes displaying this information as the wallpaper. So configured, when the time for the flight is near, the calendar alarm also triggers a display of the information the user will need to make the scheduled departure. As a further example, a user may schedule a trip to an amusement park, like Disney Land, and download a theme associated with the amusement park (e.g., by accessing a server operated by the amusement park and downloading a theme data file using wireless IP protocols). So configured, when the day of the trip to the amusement park arrives, the user's mobile handset can automatically change themes to implement displays, ring tones and other configurable aspects as appropriate to the amusement park. Thus, the mobile handset theme can be matched to the theme park.

Figure 6A:
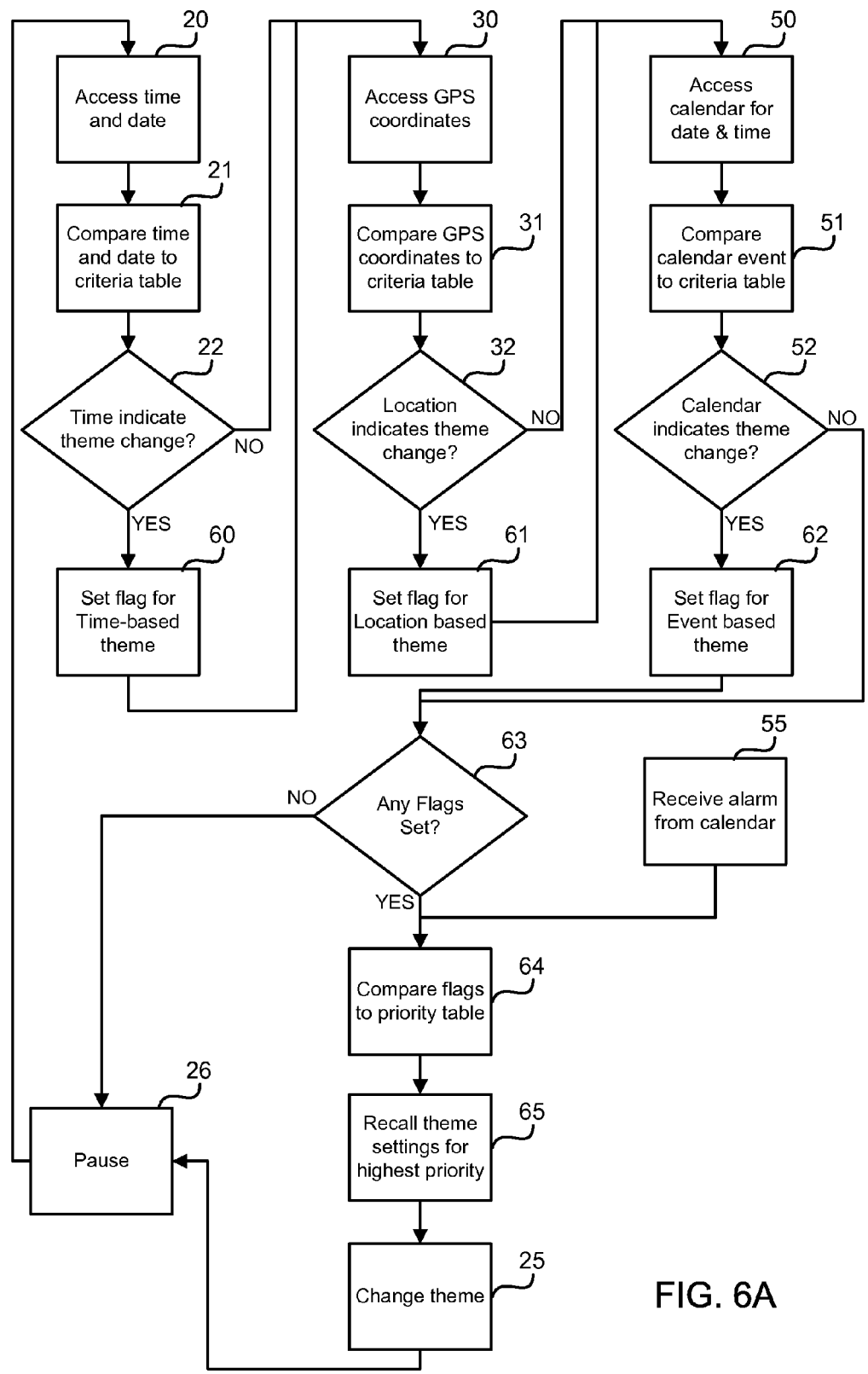
FIGS. 6A and 6B are process flow diagrams of alternative implementations of the methods illustrated in FIGS. 3 through 5 suitable for implementation on a mobile handset.

The foregoing embodiments can be implemented in a single application running on a mobile handset to change themes based upon time, location and calendar events. An example of such an application is illustrated in FIG. 6A. The illustrated process features a continuous loop in which the theme change application first accesses time and date data from memory, step 20, compares the time and date to the theme change criteria table, step 21, and tests whether a change of theme is indicated, test 22. If a change of theme is indicated by the time and date, a flag may be sent in memory indicating that a time-based theme change is indicated, step 60. Whether a theme change is indicated (in which case step 60 is performed) or not (i.e., test 22="NO"), the theme change application may next access geographic coordinates stored in memory, step 30, and compare the coordinates to the theme change criteria table, step 31. The theme change application then tests whether a change of theme is indicated, test 32, and if so, sets a flag in memory to indicate that a location-based theme change is indicated, step 61. Whether a theme change is indicated (in which case step 61 is performed) or not (i.e., test 32="NO"), the theme change application may next use the time, date and/or day of the week data to access the calendar database for events calendared for the present time and date, step 50, and compare any calendared event to the theme change criteria table to determine if a theme change may be appropriate, step 51. If so, the theme change application may then test whether a change of theme is indicated, test 52, and if so, set a flag in memory to indicate that an event-based theme change is indicated, step 62.

At this point, the theme change application may test each of the theme change flags in memory to determine if any of them have been set, step 63. If not, the loop may continue after a pause, step 26. If any one flag has been set (i.e., test 62="YES"), then the set flags and data in the theme change criteria table may be used to determine which of the satisfied theme change criteria has a higher priority, step 64. This comparison may be implemented because some theme change criteria may overrule others. For example, a time-based theme change indicated by present time correlating to normal working hours, may be overruled by a location-based theme change indicated by the mobile handset being located at a ballpark, such as may be the case when the user is on vacation or taking a day off. Similarly, the location-based theme change may be overruled by a calendar-based theme change, such as an impending airline departure or a relative's birthday (which may be why the user is at the ballpark on a work day). To provide this capability, the theme change criteria table may include a priority value associated with each criterion. The theme change application can access each of the theme change criteria records indicated by the set flags, compare their respective priorities, and select the satisfied criterion which has the highest priority value.

Having selected a particular satisfied criterion based on its priority, the theme change application may then recall the associated theme files and settings, step 65, and implement the theme change, step 25.

A calendar alarm may also be used to implement a theme change in a manner similar to that described above with reference to FIG. 5. In such a situation, it may not be necessary to determine the priority of the indicated theme change because the user made a determination when setting the alarm for the calendared event that a theme change should be made. Therefore, reception of an alarm from the calendar application, step 55, can lead directly to the theme change application recalling the indicated theme settings, step 65, and directly implementing the theme change, step 25.

The example embodiment illustrated in FIG. 6A provides the user with flexibility to establish a number of different themes with a variety of priorities and triggering criteria, so that the mobile handset automatically sets the appropriate theme based upon priorities as well as time, location or calendared event. Thus, the user can store a wide variety of themes configured for automatic display on the mobile handset without having to be concerned about whether an inappropriate theme will be presented when the user varies the daily routine (such as by going to a baseball game on a work day to celebrate the birthday of the user's son).

Figure 6B:
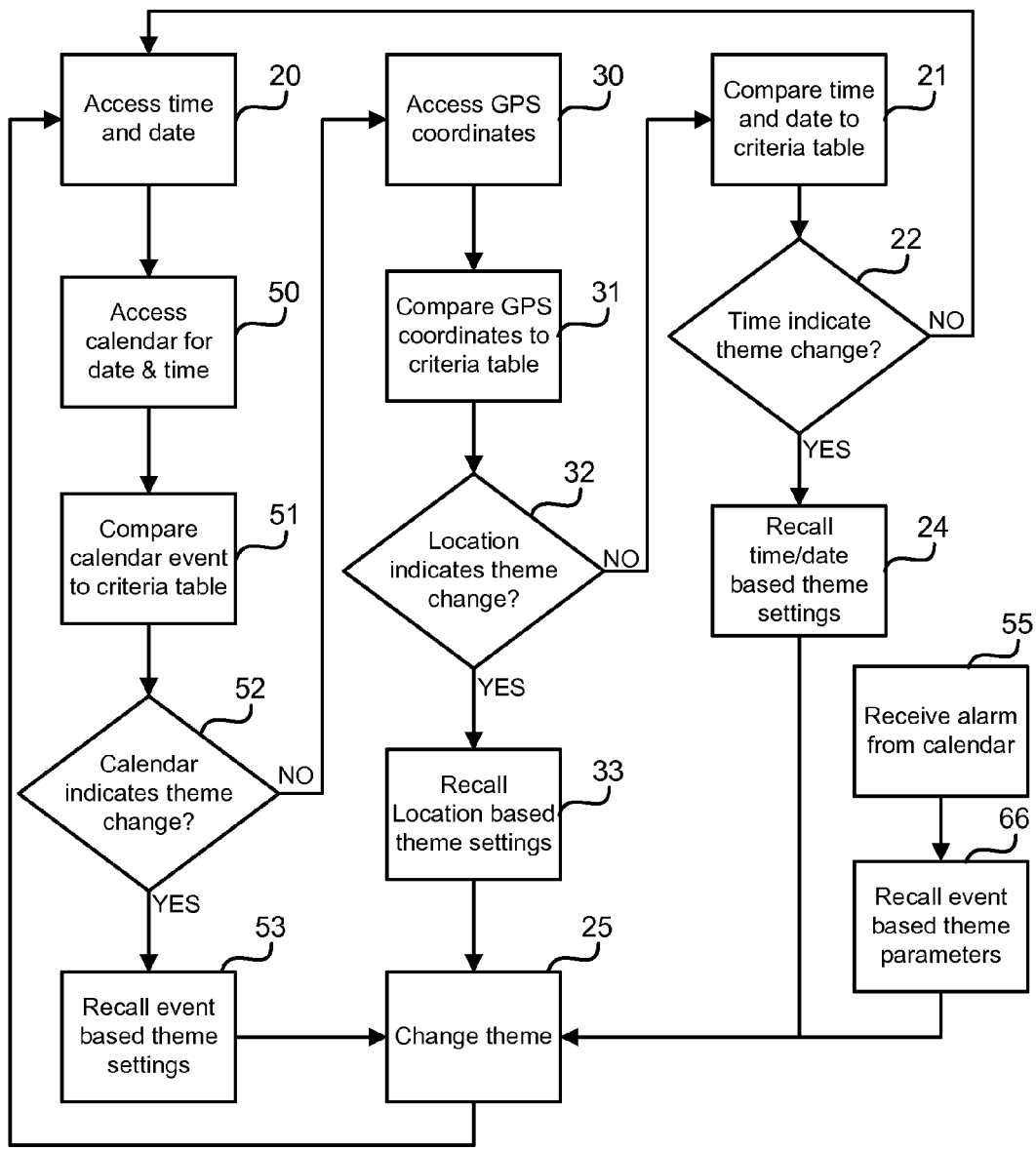

FIG. 6B illustrates an alternative implementation of the various types of theme changing processes which avoids the complexity of ascribing priority values to each criterion. Instead, this embodiment establishes a preset priority in which time-based theme changes are overruled by location-based theme changes which in turn are overruled by calendared event-based theme changes. Referring to FIG. 6B, the theme change application may access time and date from memory, step 20, and use that data to access the calendar to determine if there are any events associated with the present time and date, step 50. Any calendared event is then compared to the theme change criteria table, step 51, and the results used to determine whether a calendar-based theme change is indicated, test 52. If a calendar-based theme change is indicated then the theme change application recalls the associated event-based theme settings, step 53, and implements the theme change, step 25, before restarting the loop by returning to step 20. Only if no change in theme is indicated based on a calendared event (i.e., test 52="NO") will the theme change application access geographic coordinates stored in memory step 30, and compare the coordinates to values in the theme change criteria table, step 31. If a location criterion is indicated, the theme change application may determine whether a change of theme is indicated, test 32, and if so, recall the location-based theme settings, step 33, before implementing a theme change, step 25. Again, having changed the theme, the theme change application restarts the loop by returning to step 20. Only if no calendared event-based theme change or location-based theme change are indicated (i.e., step 32="NO") will the theme change application compare the time and date to the theme change criteria table, step 21, to determine whether a time-based theme change is indicated, test 22. As described above with respect to FIG. 2, if any time-based theme change is indicated, the theme change application may recall the theme settings associated with the matched time/date change criteria, step 24, and then implement the theme change, step 25, before restarting the loop by returning to step 20.

Similar to the process described above with reference to FIG. 6A, reception of an alarm from the calendar application, step 55, can trigger an immediate theme change. In response to receiving an alarm with a theme change indicated, the theme change application may immediately recall the theme settings indicated in the alarm, step 66, and then implement the theme change, step 25.

Figure 7:
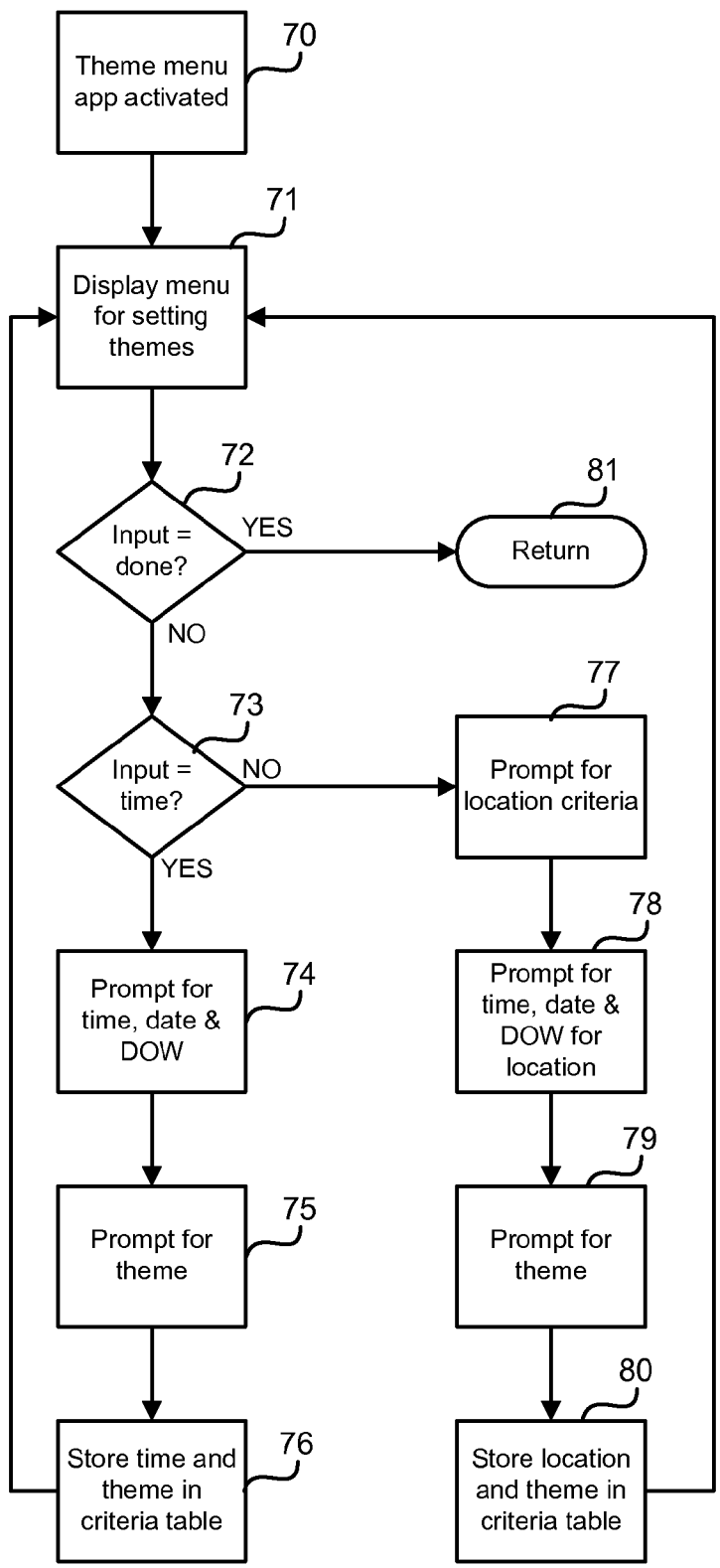
FIG. 7 is a process flow diagram of an example method for storing a theme and theme change criteria in a mobile handset memory.

To aid a user in setting up a variety of themes and theme change criteria, a menu application may be implemented on the mobile handset, such as illustrated in FIG. 7. Such a menu application may begin when activated by a user, such as by the user selecting the application from a main application menu, step 70. Upon activation, the menu application may generate a theme setup menu display consisting of a menu of choices that the user may select, step 71. For example, the display may allow the user to set a time-based theme or a location-based theme, or exit the application because the user is finished. Upon receiving a user input, which may be indicated by the activation of any button or selector switch, the application may test the input to determine the appropriate next process. If the user has selected that the input is done (in which case the results of test 72 will be "YES"), the menu application may simply exit and return processing to the operating system, step 81. If the user input was not that the input session was done, the theme change application make test whether the user selected a time-based theme, test 73. If the user selection is a time-based theme change, the menu application may then generate a display prompting the user to input the time, date and/or day of week associated with the theme, step 74, followed by a display prompting the user to enter the theme settings or identify the theme file, step 75. Once the user has finished entering the theme settings, the application stores the time, date and/or date of week along with the theme settings in a theme change criteria table, step 76. The application may then return to display the theme setup menu, step 71.

If the user input did not indicate that a time-based theme was to be entered (i.e., test 73="NO"), the menu application may generate a display prompting the user to enter a location to be used as the criteria for activating a new location-based theme change, step 77. The location criteria may be in the form of geographic coordinates, map coordinates, or simply a selection of the present coordinates, as may be accomplished when a user is assigning a theme for the present location of the mobile handset. With the location value entered, the menu application may generate a display prompting the user to enter any time, date or day of the week limitations on the location-based theme criterion, step 78. Next, the menu application may prompt the user to enter the theme settings or identify the theme file to be used at that location, step 79. Finally, the menu application stores the location, time/date, and theme settings in the theme change criteria table, step 80, before returning to the theme setup menu, step 71.

Figure 8:
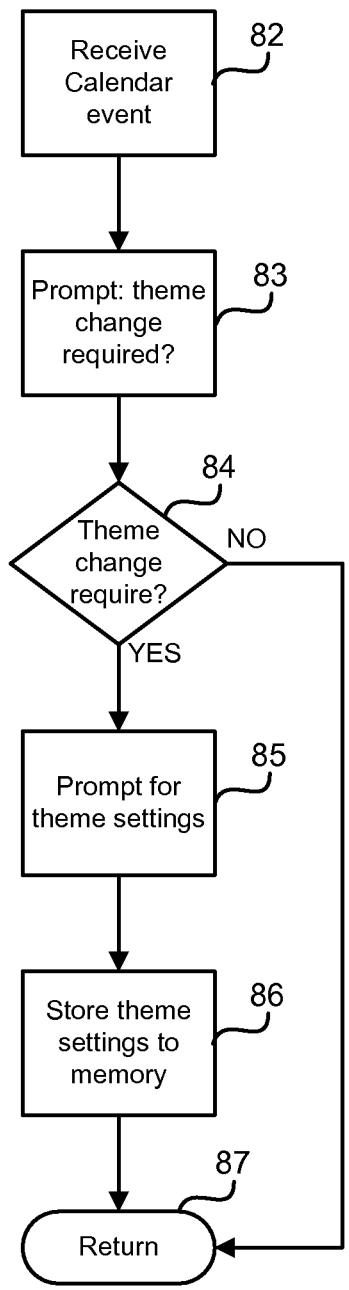
FIG. 8 is a process flow diagram of another example method for storing a theme and theme change criteria in a mobile handset memory.

The mobile handset may also be configured with software to allow users to designate theme changes as part of the process of entering events into a calendar application. An example of such a routine is illustrated in FIG. 8. As part of the normal calendaring process (i.e., the process of entering an event into the calendar application), the calendar application may receive the input of a calendar event, step 82. At this point, the calendar application may generate a display which prompts the user to indicate whether a theme change is desired when an alarm is triggered by the calendared event, step 83. If the user indicates that a theme change is desired, test 84, then the calendar application may generate a display which prompts the user to enter the theme settings or identify a particular theme already stored in memory that should be implemented when the alarm is generated, step 85. Upon receiving the user's input, the application stores the theme settings, a file name for the theme settings, or a pointer to the memory location containing the requested theme settings, step 86, before returning to the calendar application, step 87.

Allowing users to indicate theme changes as part of the normal calendaring process gives them added flexibility for tailoring their mobile handsets consistent with their plans and schedule without requiring them to enter schedule data twice. Additionally, entering theme settings at the time that events are entered into the calendar gives users the opportunity to incorporate information associated with the calendared event into the theme display. For example, when reserving an airline flight online, many reservation services allow users to automatically link reservation details to their calendar application, automatically uploading the flight schedule information. The embodiment illustrated in FIG. 8 allows users to also calendar a theme change which can incorporate the same flight schedule information without having to enter the information a second time, for example.

While the foregoing embodiments involved processes performed only on mobile handsets, the scope of the present invention is not limited to mobile handset processes alone, and may be implemented with support from external computers, such as a theme server coupled to a cellular telephone network or other wireless network. Servers have the advantage of substantially greater memory as well as access to other information resources via the Internet. Thus, servers can store a much larger variety of theme files and information. Mobile handsets may access a server via a cellular or other wireless network, and obtain the theme information, such as images and ring tones, that can be implemented in response to time, location and calendar events. By accessing a theme server for theme information, the mobile handset can provide users with more tailored theme displays and more useful theme services. For simplicity of description, a server which is configured to download theme data sets to handsets according to the various embodiments is referred to herein as a "theme server," although such a server may very well be multi functional and support a variety of other services. While in a preferred embodiment mobile handsets can obtain theme downloads via wireless networks, mobile handsets may also access a theme server via a wired network connection, such as the Internet, in order to download themes, such as based upon user selections from a catalog of available themes.

Figure 9:
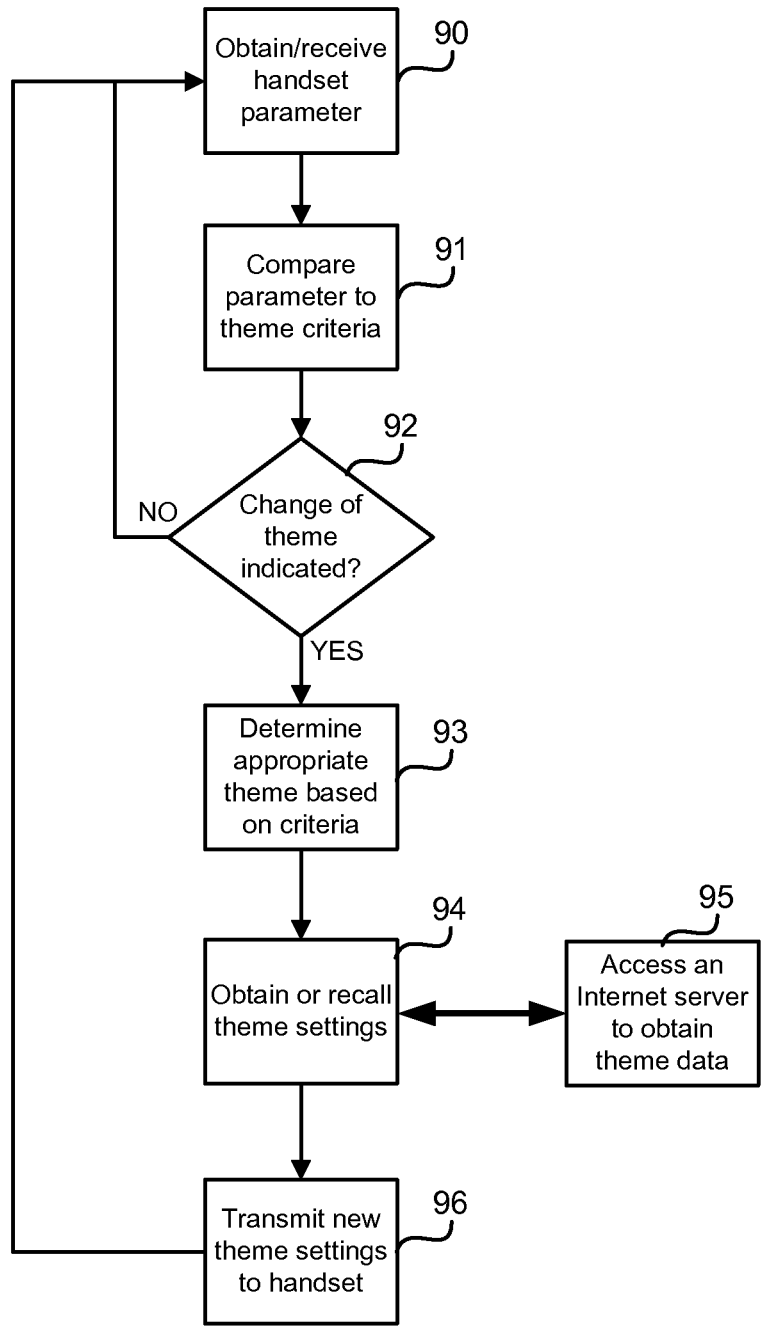

An overview of embodiment processes that may be implemented on a theme server is illustrated in FIG. 9. A theme server may obtain or received mobile handset parameter information like geographic coordinates, step 90, such as by receiving a data call from the mobile handset. A theme server may also obtain time and date information from its own internal clock, which may be obtained by the server making a call to the appropriate memory location storing the present time and date. Similar to applications implemented on the mobile handset, the theme server may compare the received or measured parameter to theme download criteria, such as by comparing the received or measured parameters to a theme download criteria table maintained in the theme server, step 91. Using results of this comparison, the theme server may decide whether a theme download is indicated, test 92, such as information available to the theme server indicates that the current theme implemented on the mobile handset is not the theme indicated by the theme download criteria table. If the theme server determines that a theme download is not indicated, the theme server may continue to monitor parameters received from mobile handsets or obtained from internal sources by returning to step 90. If the theme server determines that a theme download is indicated, the server may determine the appropriate theme based upon the matched criteria in the theme download criteria table, step 93, and obtain or recall the appropriate theme settings, step 94. With the theme settings obtained, the theme server then transmits the new theme settings and files to the mobile handset, step 96. Transmission of theme settings and files to the mobile handset may be accomplished using any well-known wireless IP protocol, including cellular telephone data calls initiated by the server or by the mobile handset.

One advantage of performing part of the theme change process on a theme server is the availability of extensive memory resources, such as large capacity database systems. An extensive library of image files and ring tone audio files may be maintained on a large database system to provide a wide variety of potential theme datasets that can be downloaded to handsets. Additionally, the theme server can access other sources of information via the Internet, such as by contacting other data servers where specific theme files are maintained, step 95. For example, if a mobile handset parameter (e.g., geographic coordinates) indicates that the mobile handset is currently visiting a particular amusement park, the theme server may access theme files stored on a server maintained by the amusement park in order to obtain up to the minute theme files appropriate to the amusement park. In this example, the amusement park server may present coupons and updated park information (such as amusement ride wait times) in the form of theme wallpapers that will appear automatically on the mobile handset's display once they have been downloaded. Further, using geographic coordinate data, the theme downloaded from the amusement park data server via the theme server can be specific to the precise location of the user's mobile handset, such as to display a map of the park indicating the present location of the mobile handset. Similarly, the theme display may be used to provide announcements or advertisements relating to services, shops or rides that are near the present location of the mobile handset.

Figure 10:
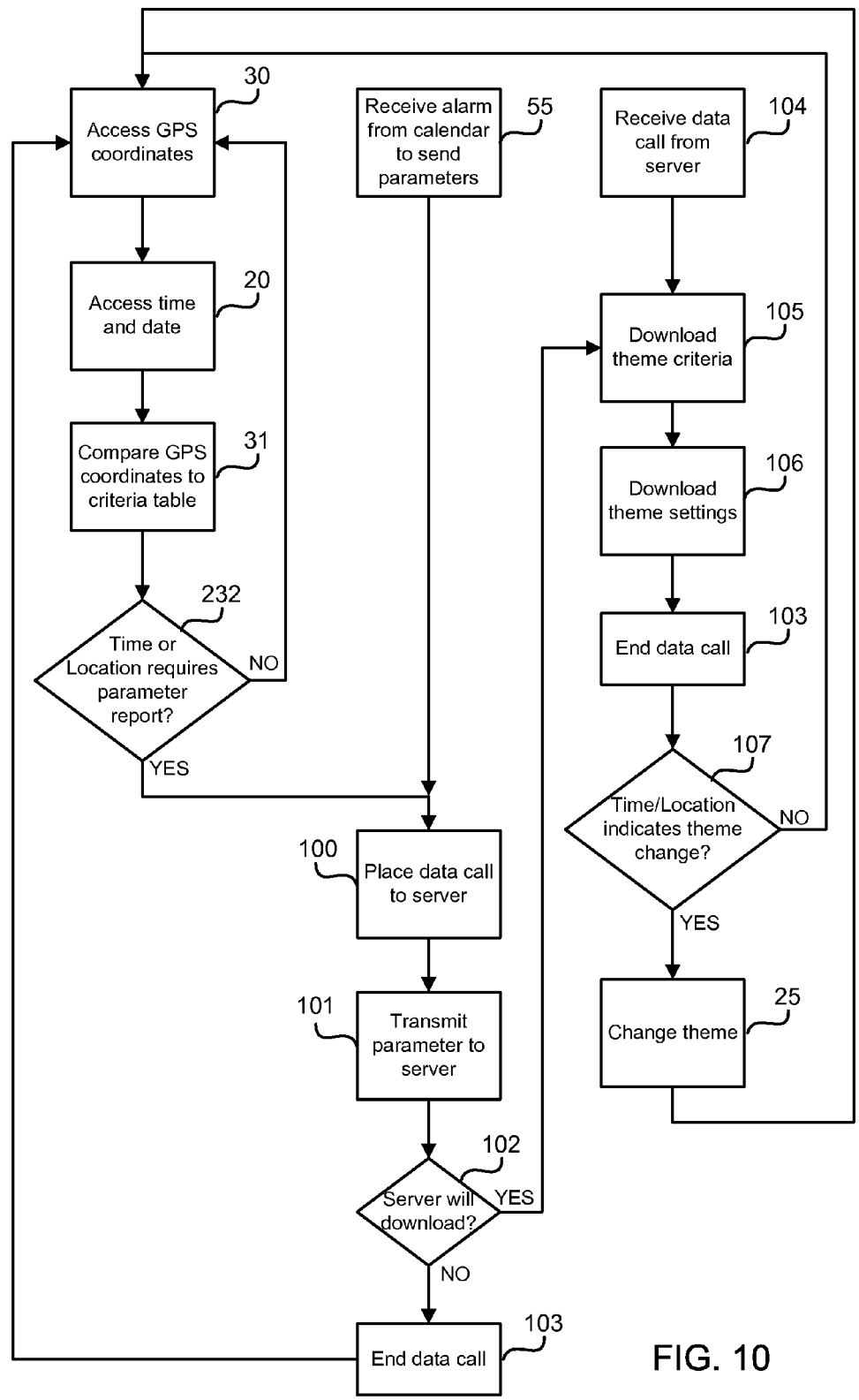
FIG. 10 is a process flow diagram of another embodiment method suitable for implementation on a mobile handset.

In order to receive theme downloads from a theme server, a mobile handset may periodically report certain parameters, such as its location, to the theme server. FIG. 10 illustrates an embodiment method that can be used to enable a mobile handset to receive appropriate theme downloads from a theme server. In this method, the theme change application running on the mobile handset processor may access geographic coordinates from memory, step 30, access time and date information from memory, step 20, and compare this information to values maintained in a parameter reporting criteria table, step 31, to determine if the application should report its location to the theme server, step 232. The processing of this step is similar to those described above for determining whether a theme change is indicated, except that the theme change application determines whether the present time and location requires a reporting of parameters to the theme server. For example, the theme change application may determine that contacting the theme server is appropriate if the comparison with the parameter reporting criteria table indicates that a theme change is indicated but the mobile handset does not have stored within a theme database the appropriate theme files (or if the theme change criteria table indicates that the mobile handset should download theme settings). Thus, the theme change application may determine that it should report parameters to the theme server by comparing parameters (e.g., time/date and location) to a parameter reporting criteria table or the theme change criteria table. If the theme change application determines that contacting the theme server is not required (i.e., test 232="NO"), the theme change application may continue the loop by returning to step 30, potentially after a delay (not shown in FIG. 10).

If the theme change application determines that contacting the theme server is required, the theme change application may direct the mobile handset's processor to place a data call to the theme server, step 100. Any of the standard wireless and cellular data transfer protocols may be used to place this data call, which may include negotiating appropriate data transfer protocols. Once a data connection has been established to the theme server, the theme change application may cause the mobile handset to transmit one or more parameters (e.g., time, location or event) to the theme server. For example, the mobile handset may transmit its geographic coordinates so that the theme server is informed of the location of the mobile handset. The mobile handset may also communicate calendar day events based upon its internal calendar database, as well as its own time and date information which might differ from that maintained by the theme server. Once the parameters have been communicated, the theme server may inform the mobile handset of whether the theme server is ready to download a theme file, such as by transmitting a message indicating that a file download is available. For example, if the theme server determines from the reported geographic coordinates that the mobile handset should receive a location-specific theme, the theme server may immediately notify the mobile handset to prepare to receive such data. The theme change application may test whether the theme server is prepared to transmit a download, such as by testing for the presence of a particular data field or a message from the theme server, step 102. If the theme change application determines that the server will not be sending a theme download, the theme change application may then end the data call, step 103, and return to the start of the loop, such as accessing geographic coordinates, step 30.

If the theme change application determines that the theme server is prepared to transmit a download (i.e., test 102="YES"), the theme change application may then accept a download of a set of theme criteria and store the downloaded criteria in the theme change criteria table, step 105. Such downloaded theme change criteria may be those criterion or criteria that are associated with the theme that is to be downloaded, i.e., the criteria that will be used by the mobile handset to determine when to implement the downloaded theme or themes. As part of a criteria download, other information required by the theme change criteria table may also be downloaded and stored by the theme change application in the mobile handset memory. By downloading the theme change criteria associated with the downloaded theme(s), the mobile handset can download themes which may be implemented at a later time or different location. Thus, the theme download is not limited to situations where the theme must be immediately implemented. For example, upon arriving at a location for which location-specific themes are available, such as at an amusement park, the mobile handset may download a number of themes that will be implemented at various times throughout the day, such as a sequence of coupons or offers, or time-keyed advertisements (e.g., for restaurants and shows). Similarly, the download may include a number of location-specific themes, such as themes to enable a walking tour of the facility which then can be recalled from mobile handset internal memory and implemented based on geographic coordinates without requiring the mobile handset to contact the theme server each time a new location-specific theme is indicated.

The theme change application also downloads the theme settings and theme files necessary to implement the theme (or themes) on the mobile handset and stores the information in a theme data file, step 106. Once the download is completed, the mobile handset may end the data call, step 102, and then determine whether the theme should be implemented by comparing present time and location parameters, for example, to the newly downloaded theme criteria, step 107. If the present time and location do not indicate that a theme change is required, the theme change application may return to monitoring parameters such as geographic coordinates, step 30. If a theme change is indicated (i.e., test 107="yes"), then the theme change process may be implemented, step 25, before returning to step 30.

The mobile handset processor may also be configured with theme change application software to contact the theme server in the event that a calendar alarm indicates that a theme change is required and specifies that the theme settings should be downloaded from the server, step 55. The theme change application may implement this process just as if it had determined that a parameter should be transmitted to the theme server in step 232. In this instance, the mobile handset may transmit the calendared event (e.g., its name or description) indicated by the received alarm to the theme server, step 101, so that the theme server can determine from the event whether a theme download is appropriate. For example, if the event description includes the words "movie" or "theatre" the theme server might download a theme that includes a wallpaper showing what is playing and show times. Conversely, if the event description is generic or includes the word "meeting," the theme server may conclude that no theme downloads are appropriate.

Additionally, the mobile handset processor may be configured with theme change application software to receive data calls from the theme server, step 104, so that the theme server can initiate the theme download. When a data call is received from a theme server in step 104, the process of downloading (steps 105, 106) and displaying the theme (steps 107, 25) may proceed in the same manner as if the mobile handset had initiated the data call.

This capability of receiving theme downloads initiated by the theme server allows mobile handsets to receive theme updates without having to prompt the theme server. This enables the theme server to transmit episodic or periodic updates to mobile handsets theme settings. Such updates are directed to specific mobile handsets since the data call is made to the mobile handset telephone number or wireless IP address, enabling subscription services and updates to selected individuals. For example, mobile handset owners may subscribe to services offered on the theme server which periodically update the themes maintained on their mobile handsets. For example, a baseball team may periodically update theme settings downloaded by subscribers to reflect current lineups, win-loss statistics, and schedule changes. As another example, bus, train and airline operators may have departure schedule changes transmitted to ticketed passengers in the form of updated theme settings including a wallpaper showing the new departure information. As a further example, a company, city government or other organization may use the capability to keep its members informed and establish a common set of speed dial settings to facilitate rapid communications. Thus, a wide variety of subscription theme services may be enabled by this embodiment.

Figure 11:
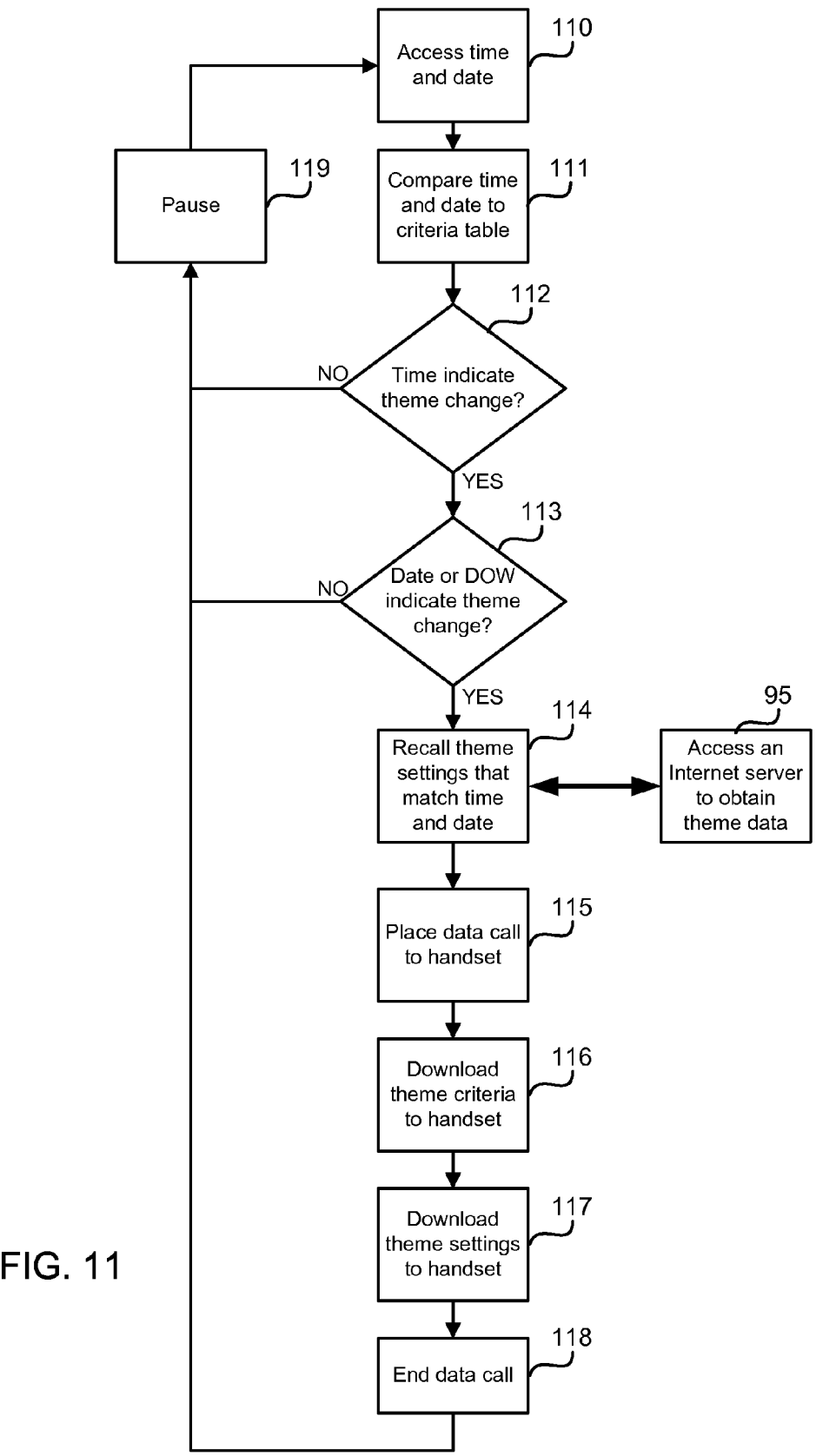
FIG. 11 is a process flow diagram of an embodiment method suitable for implementation on a theme server.

FIG. 11 illustrates the method steps that may be implemented on a theme server to support the various embodiments and enabled time-based theme changes. In this embodiment, the theme server may access its own time and data sources, such as by accessing server internal memory where such data is maintained, step 110. The theme server may compare the time and date to a criteria table maintained in server memory within the theme server to determine if a theme download may be indicated, step 111. This theme server criteria table includes the criteria which allow the theme server to determine whether particular theme data records should be downloaded to a mobile handset, and may be similar to or different from the theme change criteria table maintained in the mobile handset. If this comparison determines that a criterion is satisfied, indicating that a theme download may be appropriate, the theme server may determine whether a time-based theme download is indicated, test 112, and if it is, also test whether that theme download is appropriate for the particular date or day of the week, test 113. If the server determines that a time-based theme download is appropriate, the server may recall the theme settings from its server memory or a database coupled to the server, step 114, and place a data call to the mobile handset, step 115. As mentioned above, the data call between the theme server and the mobile handset may employ any well-known wireless or cellular wireless data transmission method and protocol. Once the data call is established and a data transfer protocol negotiated, the server may download the matched theme criteria to the mobile handset, step 116, followed by a download of the associated theme files and settings to the mobile handset, step 117. Once the theme data has been downloaded, the theme server may end the data call, step 118, and return to monitoring time, step 110. This loop may be performed periodically such as by pausing, step 119, or otherwise waiting a period of time before returning to the first step in the loop.

Figure 12:
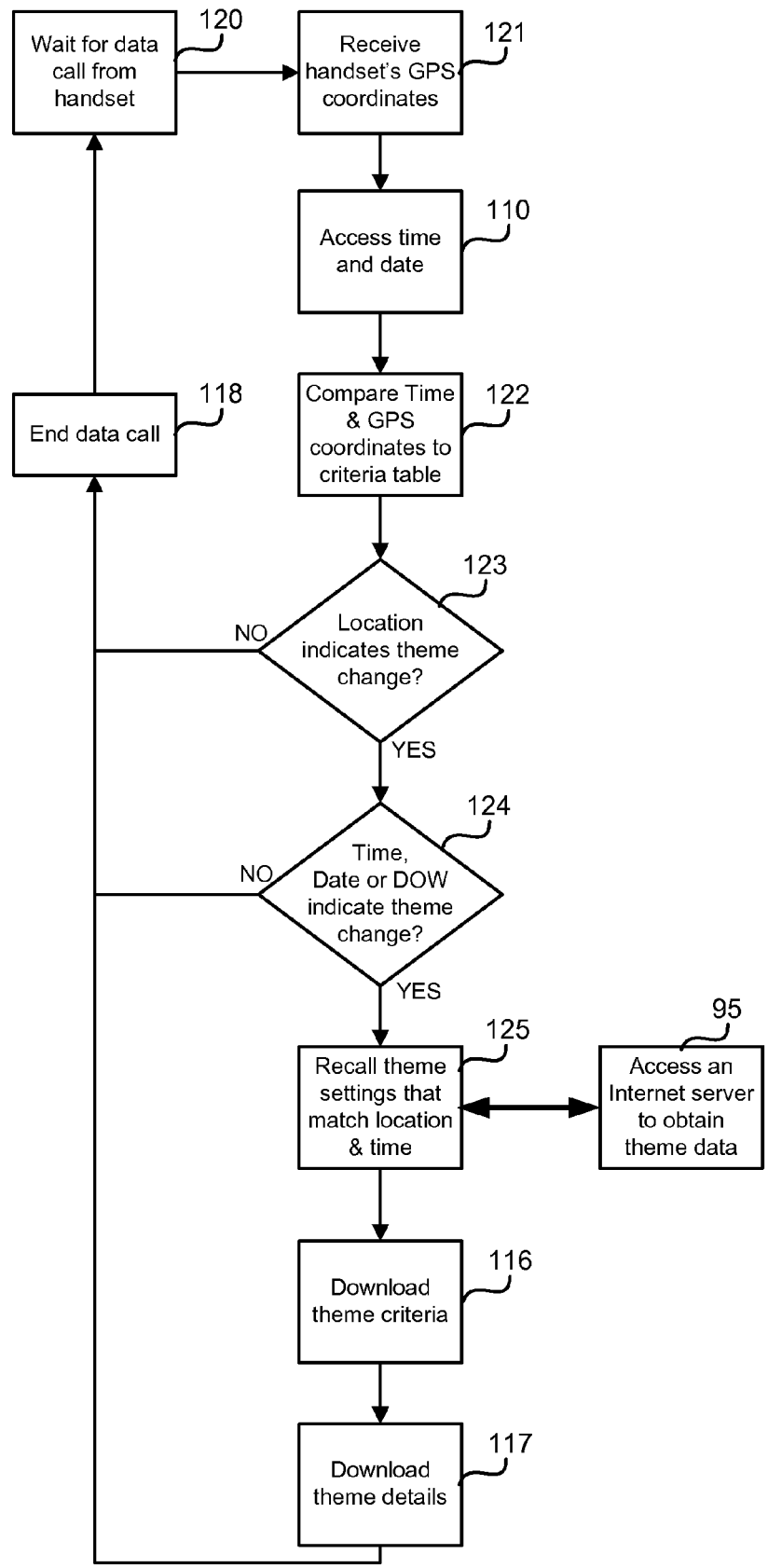
FIG. 12 is a process flow diagram of another embodiment method suitable for implementation on a theme server.

In a similar manner, the theme server may periodically receive location information from the mobile handset and use that information to determine whether a theme download should be initiated. FIG. 12 illustrates an example method for implementing this embodiment on a theme server. The theme server may stand by waiting for a data call to be received from the mobile handset, step 120. When the data call is established (including negotiations of the data transfer protocols), the theme server may receive the geographic coordinates of the mobile handset, step 121. The theme server may access internal time and data information from internal server memory, step 110, and then compare the received location and time information to the criteria table maintained in the theme server, step 122. If this comparison indicates that a theme download criteria is satisfied, the theme server may test whether the received mobile handset location indicates that a theme download is appropriate, test 123. If a theme download is not indicated by the received location data, such as the received location does not satisfy a location-based theme download criteria and the matched theme has not already been downloaded, the theme server may end the data call, step 118, and return to waiting for the next incoming data call from the mobile handset, step 120. If a theme download is indicated by the received location data, the theme server may also test whether the time, data or day of the week indicates that a theme download is required, test 124. If a theme download is not required, the data call may be ended, step 118, before the theme server returns to waiting for the next incoming data call, step 120. However, if a theme download is indicated, the theme server may recall from memory the theme settings which correspond to the matching location and time criteria, step 125. In doing so, the theme server may also access other data servers to obtain location specific theme settings for download to the mobile handset, step 95, in the manner described above with reference to FIG. 9.

Once the theme settings are recalled from server memory or obtained from other data servers, the theme server downloads the theme criteria and associated information, step 116, along with the theme settings and associated files to the mobile handset, step 117. Once the theme downloads are completed, the theme server may end the data call, step 118, and return to waiting for the next incoming data call, step 120.

Figure 13:
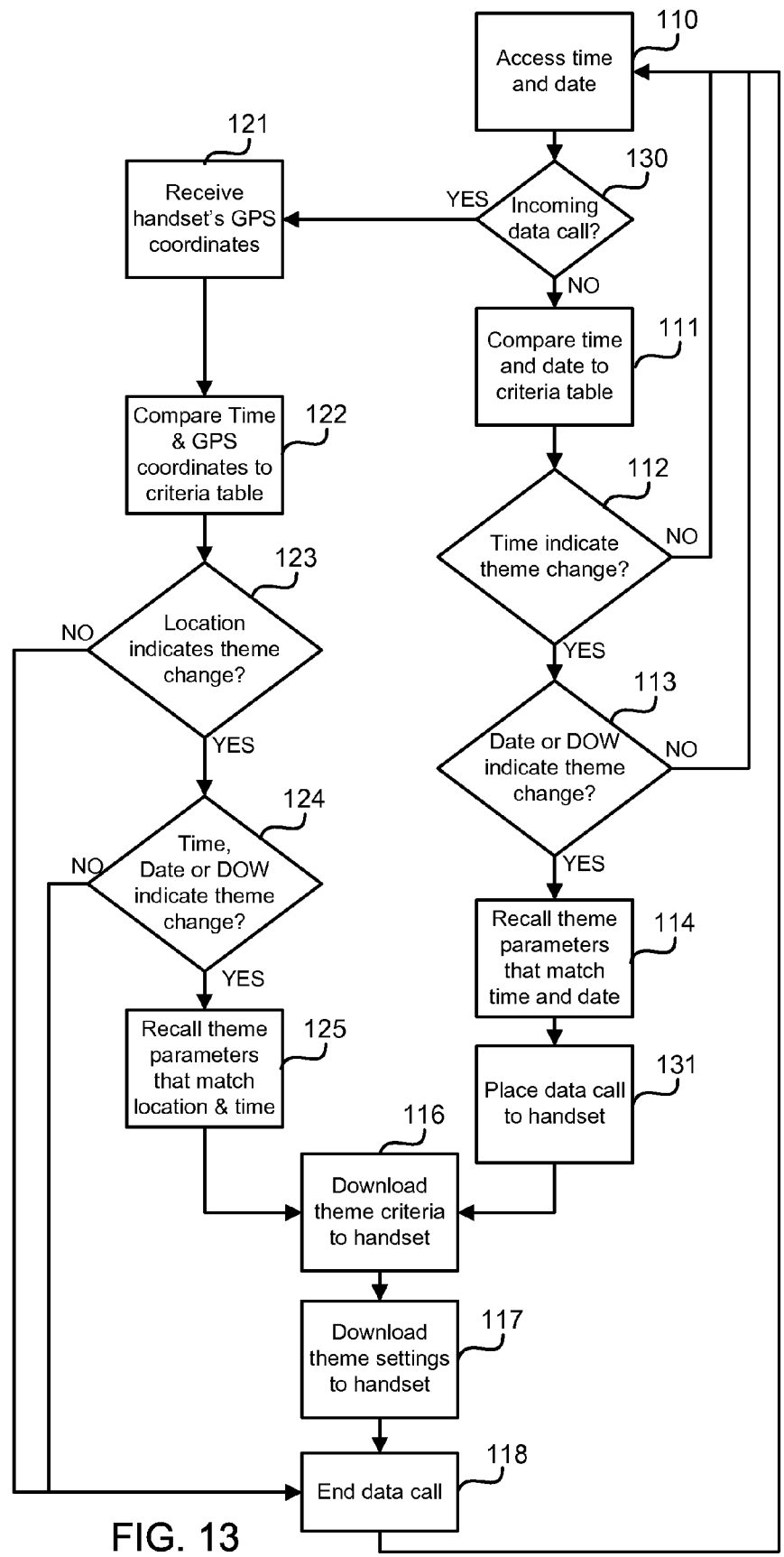
FIG. 13 is a process flow diagram of another embodiment method suitable for implementation on a theme server.

The server methods for supporting time-based theme changes and location-based theme changes may of course be implemented in a single application running on the theme server, such as illustrated in FIG. 13. As described more fully above with reference to FIG. 11, the theme server may access time and date values from its memory, step 110, compare the time and date to a criteria table, step 111, determine if a time-based theme download is indicated, tests 112, 113, recall the time and date-based theme files and settings, step 114, and place the data call to the mobile handset, step 131. Periodically during the process, the theme server may test a flag, memory value, or use other means to determine whether an incoming data call is being established by the mobile handset, test 130. Instead of performing test 130 as illustrated, notification of an incoming data call may be accomplished by an interrupt or similar software mechanism well known in the computer science arts. When an incoming data call is detected, test 130, the theme server may perform the steps of receiving geographic coordinates from the mobile handset, step 121, comparing the coordinates to a theme download criteria table, step 122, determining whether a theme download is indicated by the location and time, steps 123, 124, and obtaining the appropriate location-based theme files and settings from server memory, a database or other data storage, step 125.

Whether the theme server has determined that a time-based theme download is indicated or a location-based theme download is indicated, the theme server may implement the steps of downloading the theme criteria to the mobile handset, step 116, downloading the theme settings and associated files to the mobile handset, step 117, and ending the data call, step 118, as described more fully above with reference to both FIGS. 11 and 12.

In some implementations, a user's calendar may also be maintained on the theme server, such as in situations where the theme server maintains a copy of the calendar database by periodically downloading calendar data from the mobile handset. Alternatively, users may not maintain a calendar on their mobile handset, and instead maintain their calendar on a centralized a server accessible to the theme server or on the theme server itself. In yet another implementation, employers may maintain an enterprise calendar of enterprise events and employee commitments on a server accessible to the theme server or on the theme server itself. When a calendar is implemented on a server, the theme server can use the schedule information in the associated calendar database to determine if themes should be downloaded to mobile handsets. An illustration of this embodiment is provided in FIG. 14, which implements calendar-based download functionality within the process described above with reference to FIG. 13. This embodiment also allows the theme server to receive information regarding calendared events from the mobile handset (such as when a personal calendar is maintained on the mobile handset and an enterprise calendar is maintained on a server) and implement an appropriate theme download. This embodiment may be substantially similar to the method described above with reference to FIG. 13, with the additional functionality associated with calendar operations, steps 140-145. Accordingly, the descriptions of the steps illustrated in FIGS. 11-13 are incorporated by reference for similar steps shown in FIG. 14.

If the theme server maintains a calendar database for a user, the theme server may use the present time and date to access the calendar database to determine if any events are scheduled, step 140. This data access may be similar to step 50 performed by the mobile handset processor which is described above with reference to FIG. 5. If an event is stored in the calendar data base corresponding to the present time and date, the theme server may compare that event to a theme criteria table, step 141, to determine if a theme download may be appropriate. As with other process embodiments, the theme server may test whether a theme download is indicated, test 142, and if so, obtain the theme files and settings that correspond to the calendared event, step 143. In obtaining theme files and settings for the calendared event, the theme server may also access other servers for data related to the event, such as described above with reference to FIG. 9 (step 95). Finally, the theme server may download the theme criteria and the theme files and settings to the mobile handset, steps 116, 117, and end the data call, step 118.

The theme server may also be configured to receive notice of events from the calendar application maintained on the mobile handset. If an incoming data call is detected, test 130, the theme server may test the incoming data packet received from the mobile handset to determine if it includes a calendared event, test 145. If it does, the theme server may compare the received event to a criteria table, step 141, before proceeding with the rest of the process described above.

As mentioned above, the ability of the theme server to track or receive calendared events and access databases for themes related to such events, enables applications that can provide a variety of useful services to users via event specific theme implementation. Since a calendar may be maintained on the theme server, institutional calendars, such as a calendar maintained by the user's employer, can be used with the various embodiments to provide employee handsets with event specific theme settings. For example, a trucking company which provides its drivers with cellular mobile handsets may use such a system to communicate basic information required by all drivers depending upon the time of day by transmitting a theme to each mobile handset based on the calendar. In this manner, on-duty drivers may be provided with a daytime theme which provides scheduling information on the wallpaper and speed dial settings appropriate for the day shift, and a nighttime theme which provides the nighttime schedule on the wallpaper and speed dial settings appropriate for the night shift, while releasing the mobile handsets to the drivers' personal theme settings when drivers are scheduled to be off-duty.

As a further functionality enabled by the capabilities of the various embodiments, mobile handset users may also contact a theme server on their own initiative and request theme downloads by topic or by file name. The theme server can support providing specifically requested theme downloads, such as by implementing the functionality illustrated in FIG. 15. Upon receiving a request from the mobile handset for a particular theme download, step 150, the theme server may determine from the request the appropriate theme to be downloaded, step 151. For example, a request for a theme related to a particular recording artist may require the theme server to select a particular theme to be downloaded, such as if the recording artist has stored multiple theme files for distribution to fans or subscribers. In such a situation, the theme server may check a data record of theme files downloaded to that particular handset to determine the theme files which have not yet been downloaded. As another example, the request from the user may be imprecise, such as requesting a theme download related to a particular location or event which does not directly match a theme file stored in memory. In such a situation the theme server may need to select from a number of theme files a particular file which most closely matches the user's request. Once the appropriate theme file has been identified, the theme server may obtain the theme files and settings from memory, step 152, which may also involve accessing data servers via the Internet in order to download additional theme files and setting data, step 95. When the theme server has the requested theme data available, it can transmit the theme settings and files (e.g., wallpaper image and ring tone audio files) to the mobile handset using well known wireless data transfer protocols, step 153. Since the mobile handset requested the theme download, there may be no need to transmit theme change criteria. Finally, with the download complete, the theme server may terminate the data call, step 118.

The foregoing embodiment descriptions refer to a theme change criteria table stored in a mobile handset memory for use in determining whether a theme change is appropriate in response to a present time, date, location, calendared event or other parameter. The use of such a data table can simplify the theme-changing application software as well as provide the user with greater flexibility for establishing conditions that will cause theme changes to occur automatically. Also, as mentioned above, the various theme data sets (i.e., the collection of image files, audio files, and data records that make up a theme) may be stored in a database of themes for easy access by the mobile handset processor. Similar data structures may be implemented on a theme server in a theme download criteria table and a database of theme data sets available for downloading to mobile handsets. Illustrative examples of such data structures are provided in FIGS. 16 and 17.

Figure 16:
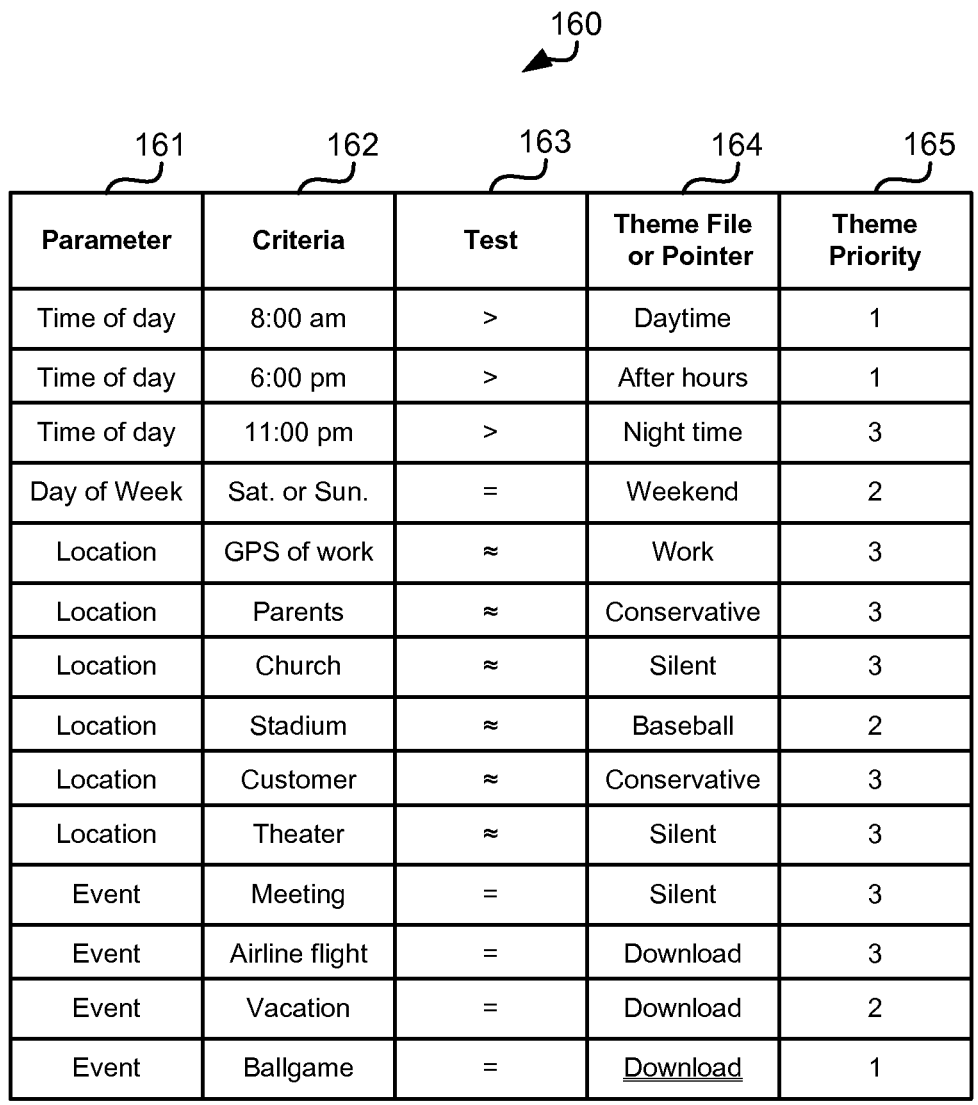
FIG. 16 is a diagram of a theme data structure suitable for use with various embodiments.

Referring to FIG. 16, various criteria for changing themes may be stored in a data table 160 in the mobile handset's memory that can be easily accessed by the mobile handset processor. Similar data tables may also be implemented in the theme server. As would be understood by one of skill in the art, data may be stored in files with an organization referred to as a data table 160 since the data may be represented as a number of rows and columns reflecting the number of data records (rows) within the data file and data fields (columns) within each data record. In a theme change criteria table a first data field 161 may store the type of parameter to be evaluated, such as for example, time of day, day of week, calendar day, location, event, or other parameter (e.g., incoming telephone number, incoming SMS number, service provider, etc.). This parameter data field 161 can be used by a theme change application to select data records which include criteria related to the particular parameter being compared.

A second data field 162 in the data table 160 may store a criterion or value which, if matched or satisfied, will indicate that a theme change is appropriate. The type of data stored in value data field 162 will depend upon the type of parameter being compared. Thus, if the parameter indicated in the parameter data field 161 is time of day, the data stored in the value data field 162 will be a time, as illustrated in the first data row in FIG. 16. Similarly, if the parameter indicated in the parameter data field 161 is location, the data stored in the value data field 162 will be a set of geographic coordinate values (or map coordinate or other location-related data value). Some value data fields may include user-defined values, particularly where the parameter is not related to time or location. For example, if the parameter data field 161 contains "Event," the data in the value data field 162 may be a description of the event or a word likely to be in the calendar entry, such as "meeting," or "flight" or "vacation." The parameter data field 161 may also include wild card entries, like "other" which may permit the user to define a criterion by entering an appropriate text or data in the value data field 162.

A third data field 163 in the data table 160 may store an operator or test to be used when comparing a present parameter (e.g., time, day, location, etc.) to the criteria value in the value field 162. By including the type of comparison to be conducted in a test data field 163, the user is given greater flexibility for customizing the operation of the theme change application and finer control over when themes will be changed. Examples of such operators or tests include, but are not limited to: equals ("="); greater than (">"); less than ("<"); in the vicinity or close ("≈"); and, not equal ("≠").

A fourth data field 164 in the data table may store a file name or pointer to the memory location containing the particular theme settings and files associated with the criterion in the value data field 162. This pointer data field 164 stores the information that the theme change application needs to access the theme data that will enable the theme change application to implement the associated theme if the comparison of the present parameter to the value in the value data field 162 meets the test contained in the test data field 163.

As illustrated in FIG. 16, the pointer data field 164 may also be used to direct the theme change application to obtain theme data from sources other than internal memory. For example, the pointer data field 164 may store a wild card value (e.g., "download") which instructs the theme change application to contact the theme server to obtain the appropriate theme data. As another example, an IP address for a server may be stored in the pointer data field 164, thereby instructing the theme change application to contact a specific server. Thus, a user could configure the theme change application to contact the server associated with a ballpark or a favorite vacation spot whenever the mobile handset determines that its geographic coordinates match those of the ballpark or vacation spot. Also, since the values contained in a theme change criteria record may be downloaded from a theme server (as is described above), a downloaded theme may require the mobile handset to contact a particular server, website or webpage to obtain theme downloads.

A fifth data field 165 in the data table may store a priority value associated with the particular theme change criterion. As discussed above, some embodiments may enable theme changes based upon more than one parameter, such as time, location and event as illustrated in FIG. 6A. To permit a theme change application to select the appropriate theme to implement when comparisons of present parameters (e.g., time, date and location) match multiple criteria, each theme may be associated with a priority value. Using this priority value, the theme change application can implement the indicated theme which has the highest priority. By making theme priority a user-defined value, users are provided greater flexibility for customizing the themes displayed on their handset under a wide variety of circumstances.

When the theme change application compares a present parameter to the theme change criteria table 160, the theme change application may select the first data record (i.e., row) in which data in the parameter data field 161 is of the same type as the parameter being compared. Thus, if the parameter being compared is time of day, the theme change application would find a match in the first row of the illustrated theme change criteria table 160. Having selected a particular data record, the theme change application may access the criteria value from the value data field 162 and the criteria test from the test data field 163, and then perform the indicated test to compare the present parameter value to the accessed criteria value. For example, if the data type is numerical in nature, such as time of day, the comparison may be performed by subtracting the present value from the criteria value and then testing the difference to determine if: the difference is zero, (thereby satisfying the "=" test); the difference is less than zero (thereby satisfying the "<" test); the difference is greater than zero (thereby satisfying the ">" test); or if the absolute value of the difference is less than a threshold value (thereby satisfying the "≈" test). Similar well known operations may be performed on text values (e.g., for events) and geographic coordinates. If the comparison reveals that the indicated test is satisfied, then the change criteria is satisfied and the theme change application may access data in the file pointer data field 164 and priority data field 165. As described more fully above, the theme change application can use the priority value to select a particular theme to implement when multiple criteria are satisfied, and then use the value obtained from the pointer data field 164 to access theme settings and associated image and audio files.

Whether the comparison reveals that the indicated test is satisfied or not, the theme change application may continue searching the theme change criteria table, repeating the indicated comparison for each criteria record matching the parameter being compared. In this manner, the theme change application can identify all criteria that are presently satisfied before determining which of the satisfied criteria will be implemented. For example, as illustrated in FIG. 16, if the current time that is being compared is 11:30 PM, the criteria of >8:00 AM, >6:00 PM and >11:00 PM would be satisfied. In such a situation the theme change application may select the criteria best satisfied, most relevant or according to a priority criteria, or according to another criteria included within the theme change criteria table 160.

The theme change criteria table 160 may include more that one criterion per data record in order to allow comparison of multiple criteria simultaneously. For example, the data table may be organized to include a second value data field (not shown) and second test data field (not shown), which might be used, for example, to indicate a time or date qualifier on a location or event. Such additional criteria values and tests would be applied in a manner similar to that described above. For example, if a data record includes a first parameter value of "location" and a first criterion value of a work site location, and a first comparison indicates the present location is close to the work site location, a second comparison of the present time (or day of the week) to a time criteria may be accomplished to determine if the associated work theme should be implemented.

The theme change criteria table 160 data records may also include an independent key or index data field (not shown in FIG. 16) which may be used to simplify access to data records by the theme change application.

A similar data structure to that described above for the theme change criteria table may be used for other decision criteria tables that can be used to configure and control the theme change application as well as a theme server application. For example, a parameter reporting criteria table may be implemented to contain a variety of criteria that the theme change application can use to determine when to place a data call to a theme server to report parameters. Such a data table may also include an IP address data field so that when the theme change application determines that a present parameter matches a parameter reporting criterion, the application is informed of the appropriate IP address to access to accomplish the reporting.

If a theme change criteria is satisfied, the theme change application can use the file location information from the pointer data field 164 to locate and access the associated theme settings and files. A number of different themes may be stored in the mobile handset memory, such as in a theme data table 170 illustrated in FIG. 17. Like any data table, each data record (i.e., row) may include an index or independent key field 171. This index or independent key value may be used by the theme change application to locate the appropriate theme record. For example, the value in the pointer data field 164 of the theme change criteria table 160 may be the index or independent key of the appropriate theme data record in the theme data table 170.

A second data field 172 in the theme data table 170 may include a name or other identifier for the theme. This file name may be used by the theme change application to select a particular theme file, such as if the theme name is included in the pointer data field 164 of the theme change criteria table 160. Also, the file name may entered by the user to be used in selecting themes to implement and edit.

A third data field 173 in the theme data table 170 may include a file name or pointer to the location in memory storing the image file that will be implemented as the wallpaper image. Typically, the wallpaper displayed on a mobile handset will be an image stored in the mobile handset memory, which may either be linked to the wallpaper setting or copied to a wallpaper image register. Thus, the wallpaper data field 173 need only include the address, file name or other memory location information that is used by the mobile handset to implement an image as the wallpaper.

A fourth data field 174 in the theme data table 170 may include a file name or pointer to the location in memory storing the audio file that will be implemented as the basic ring tone. Typically, the ring tones implemented on a mobile handset may be any audio file stored in the mobile handset memory, which may either be linked to the ring tone setting or copied to a ring tone audio register. Thus, the general ring tone data field 174 need only include the address, file name or other memory location information that is used by the mobile handset to implement an audio file as the general ring tone.

Typical mobile handsets provide for a number of different ring tones, such as different ring tones for calls incoming from family, friends, work, etc. Thus, the theme data table 170 may include a number of ring tone data fields, such as a special ring tone data field 175. As with the general ring tone data field 174, the data in this field need only include the address, file name or other memory location information that is used by the mobile handset to implement an audio file as the special ring tone.

A theme may also include a number of other user-definable configuration settings, such as button tones (which will be similar to ring tones in structure), button functions and speed dial settings. Depending upon the make and model of the mobile handset such additional theme settings may be stored as data records. For example, a speed dial setting data field 176 may be included in the theme data table 170. Such a data field may include binary data that links a particular telephone number to a particular speed dial button. Thus, there may be several speed dial setting data fields 176, one for each speed dial button, within the theme data table 170.

Figure 18:
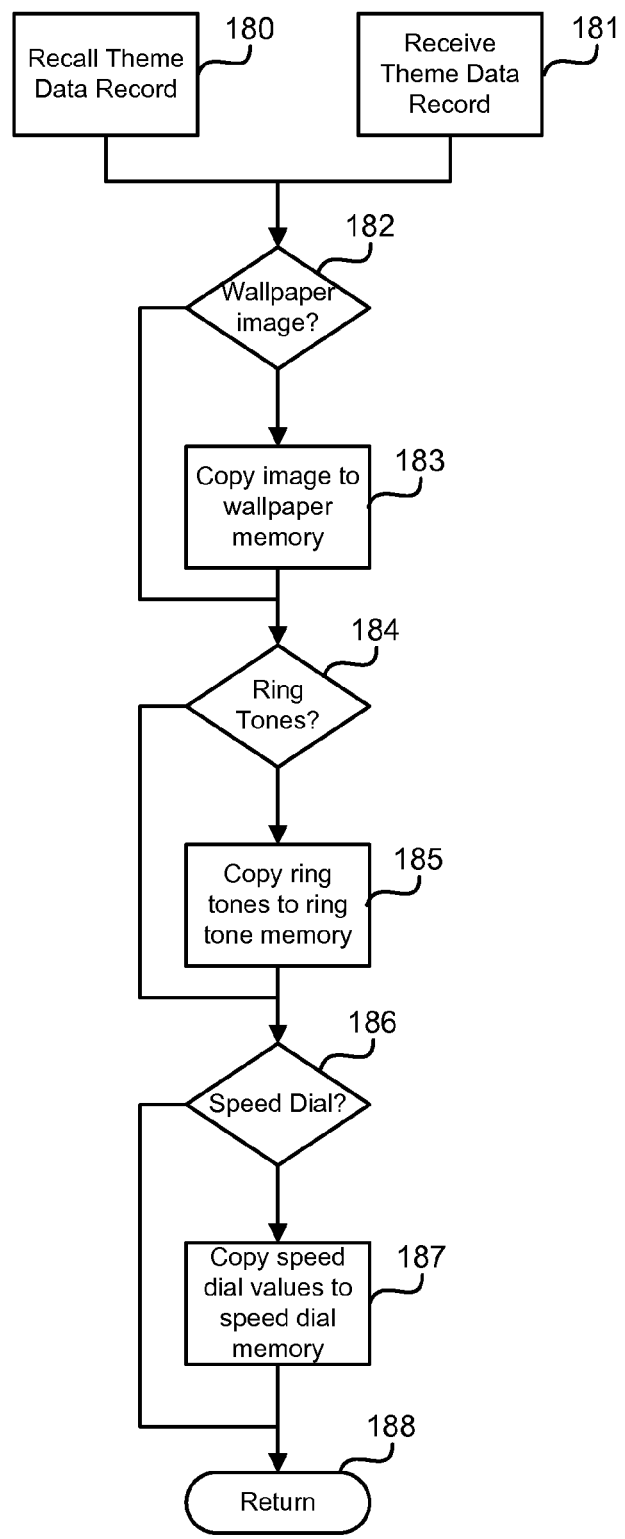
FIG. 18 is a process flow diagram of a detail method for changing theme settings in a mobile handset.

When the theme-change application determines that the theme should be changed, it can use the theme data from the appropriate record in the theme data table 170 to make the change. An example method for implementing a theme change is illustrated in FIG. 18. As a first step, the theme change application may recall data (including file location pointers) from a particular theme data record, step 180. In situations where the theme data has been downloaded to the mobile handset, the theme-change application may receive the data from a data call, step 181. A theme may not include data in each data field, since themes do not necessarily have to include a wallpaper image, a ring tone, and/or other customizations. Therefore, the theme-change application may test whether a value is included in a data field before implementing the associated theme configuration. For example, the theme change application may first test whether there is data in the wallpaper data field 173, test 182. If there is data in this field, the theme change application copies the data to the memory register that sets the wallpaper, step 183. For example, if the wallpaper data field 173 includes the address of the image to be used as wallpaper in the new theme, the theme change application may simply copy the address to the register which the mobile handset processor uses to select the image for display as the wallpaper.

After setting the wallpaper, step 183, or if there was no data in the wallpaper data field 173, the theme change application may test whether there is data stored in a ring tone data field 174 (and/or 175), test 184. If there is data in this field, the theme-change application copies the data to the memory register that sets the ring tones, step 185. For example, if the ring tone data field 174 (and/or 175) includes the address of the audio file to be used as a ring tone in the new theme, the theme change application may simply copy the address to the register which the mobile handset processor uses as the ring tone. If the mobile handset processor stores the ring tone in a particular register, the theme-change application may access the ring tone file and copy its contents to the ring tone register. This process may be repeated for each ring tone supported by the mobile handset.

After setting the ring tone(s), step 183, or if there was no data in the ring tone data field ring tone data field(s) 174 (and/or 175), the theme change application may test whether there is data stored in a speed dial setting data field 176, test 186. If there is data in this field or fields, the theme change application copies the data to the memory register that sets speed dial settings, step 187. This process may be repeated for each speed dial button supported by the mobile handset.

Finally, after all theme settings and files have been implemented, the theme change application may return to monitoring parameters, step 188.

The embodiment methods illustrated in FIGS. 1-15 and 18 are intended only to be illustrative examples because the subject matter of the claims may be implemented in software operating on handsets and on a theme server with a variety of similar methods, algorithms and software routines. Similarly, the data structures illustrated in FIGS. 16 and 17 are intended only as example structures that may be used with the various embodiments, and not intended to limit the embodiments or claims to those or similar data structures.

The embodiments described above may be implemented on any of a variety of mobile handsets, such as, for example, cellular telephones, personal data assistants (PDA) with cellular telephone or WiFi capability, mobile electronic mail receivers, mobile web access devices, and other processor equipped devices that may be developed in the future that employ personalized themes and connect to a wireless network. Typically, such mobile handsets will have in common the components illustrated in FIG. 19. For example, the mobile handset 190 may include a processor 191 coupled to internal memory 192 and a display 193. Additionally, the mobile handset 190 will have an antenna 194 for sending and receiving electromagnetic radiation that is connected to a wireless data link and/or cellular telephone transceiver 195 coupled to the processor 191. The processor 191 may be any programmable microprocessor, microcomputer or multiple processor chip or chips that can be configured by software instructions to perform a variety of functions, including the functions of the various embodiments described above. Typically, software applications may be stored in the internal memory 192 before they are accessed and loaded into the processor 191. In some mobile handsets, the processor 191 may include internal memory sufficient to store the application software instructions. For the purposes of this description, the term memory refers to all memory accessible by the processor 191, including internal memory 192 and memory within the processor 191 itself. User data files, such as the theme databases illustrated in FIGS. 16 and 17, are typically stored in the memory 192. In many mobile handsets, the memory 192 may be a volatile or nonvolatile memory, such as flash memory, or a mixture of both. Mobile handsets typically include a key pad 196 or miniature keyboard and menu selection buttons or rocker switches 197 for receiving user inputs. Additionally, many handsets include a GPS receiver circuit 198 coupled to the antenna 194 and to the processor 191 so the processor 191 can receive GPS coordinate (as well as accurate time) information.

The various embodiments described above are implemented on a typical mobile handset 190 by storing a theme change application in memory 192 which comprises processor executable software instructions that will cause the processor 191 to execute the embodiment methods described herein.

Figure 19:
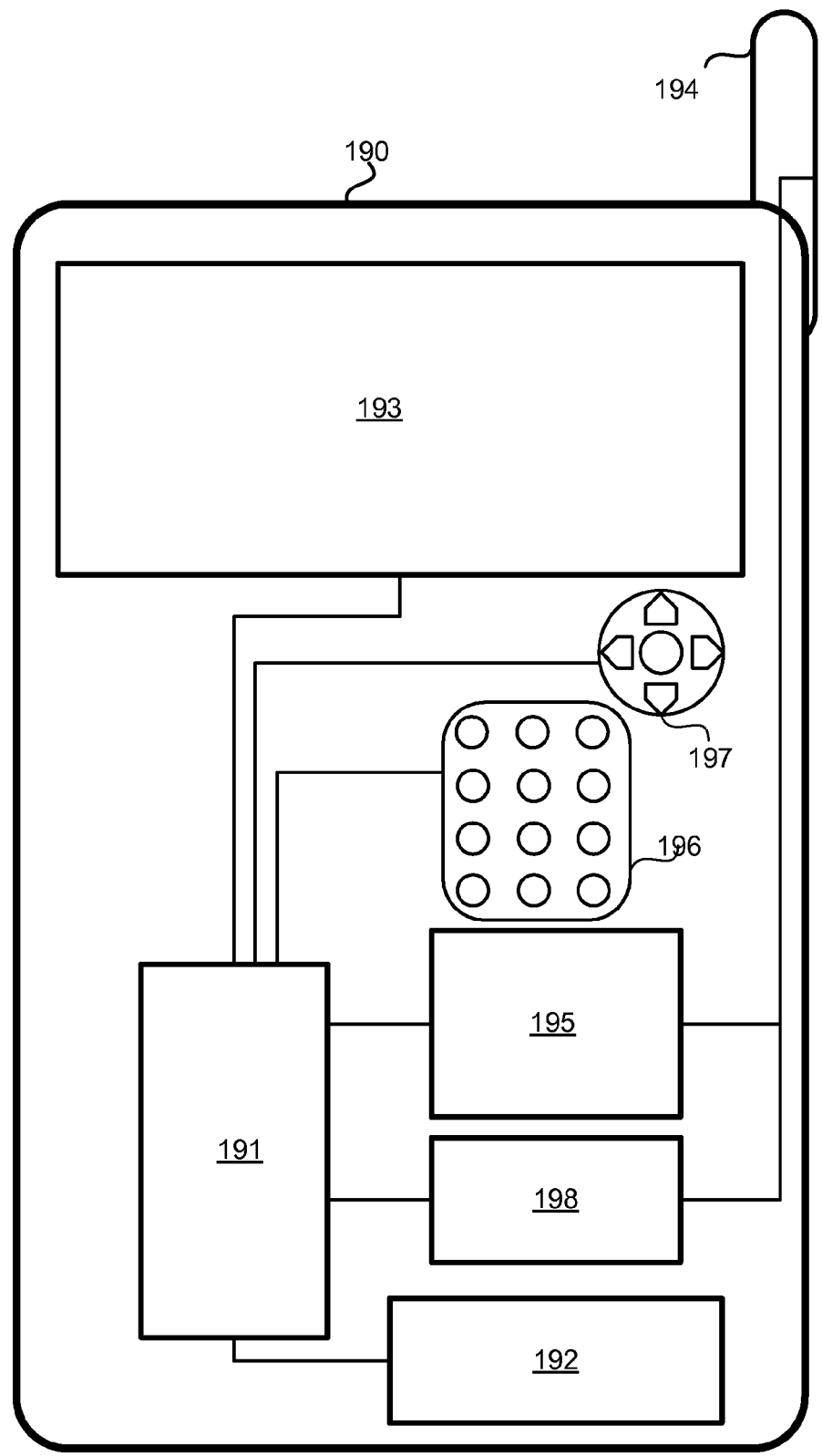
FIG. 19 is circuit block diagram of an example handset device suitable for use with the various embodiments.
Figure 20:
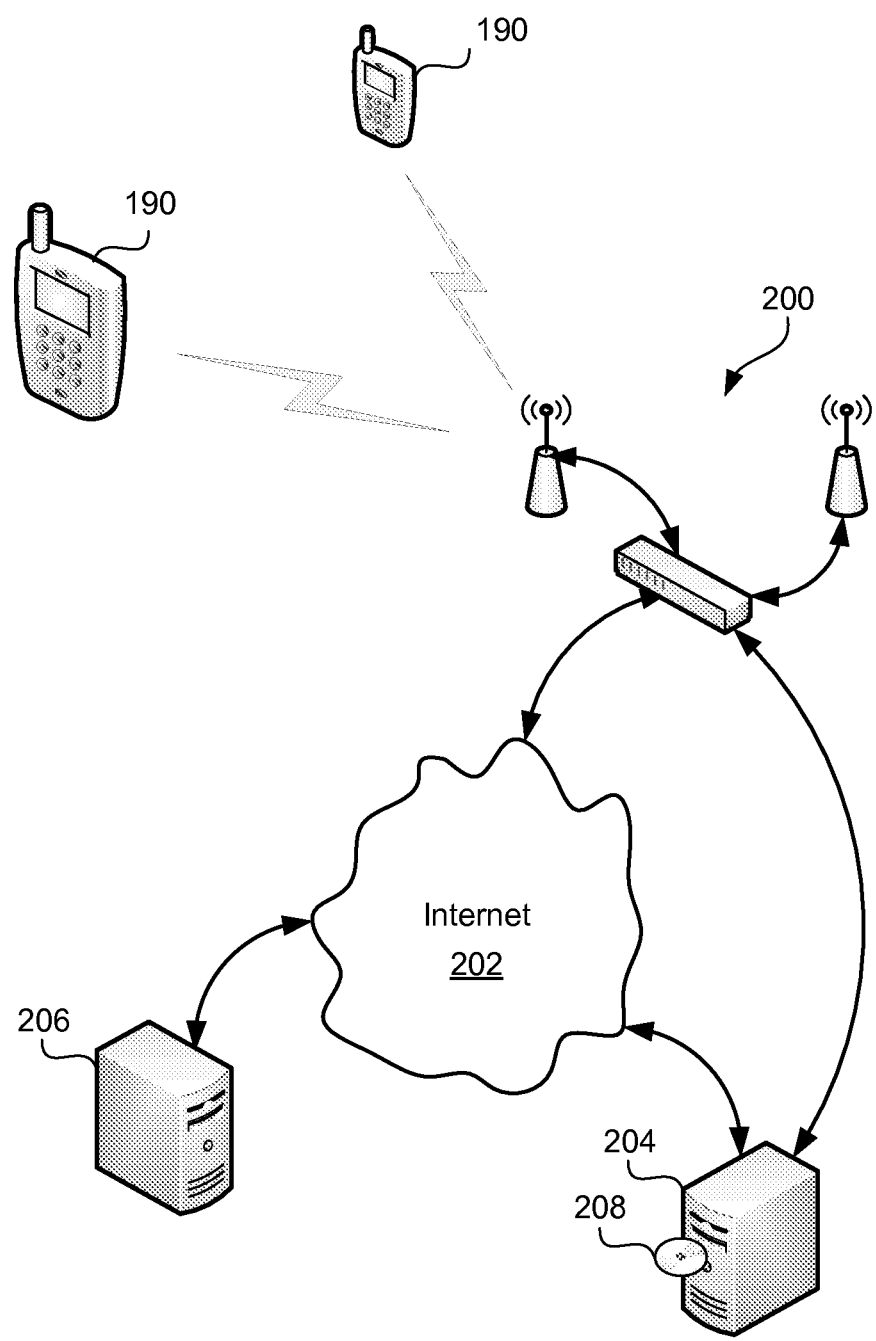
FIG. 20 is a system block diagram of a system suitable for use with the various embodiments.

Mobile devices 190 such as illustrated in FIG. 19 configured to implement themes based upon time and location may be used in conjunction with the system illustrated in FIG. 20. This system includes mobile handsets 190 capable of making data calls via a cellular telephone network 200 to connect to the Internet 202 and access a theme server 204 via IP protocols. Mobile handsets 190 may also contact a theme server 204 directly via a cellular telephone network 200 or another wireless data network. The technologies, protocols and circuit elements by which the mobile handsets 190 make data calls to the theme server 204 via the cellular telephone network 200 and the Internet are all well known and commercially available, and therefore require no further description. The server 204 may also be able to access other data servers 206 via the Internet for purposes such as to access and obtain theme data files. While FIG. 20 shows mobile handsets 190 coupled to a cellular telephone network 200, the mobile handsets 190 may also or alternatively connect to a wireless (e.g., WiFi) data network which will also consist of dispersed communication towers as shown in FIG. 20 (and thus would be illustrated identically with the exception perhaps of a different identifier for the wireless network).

Figure 14:
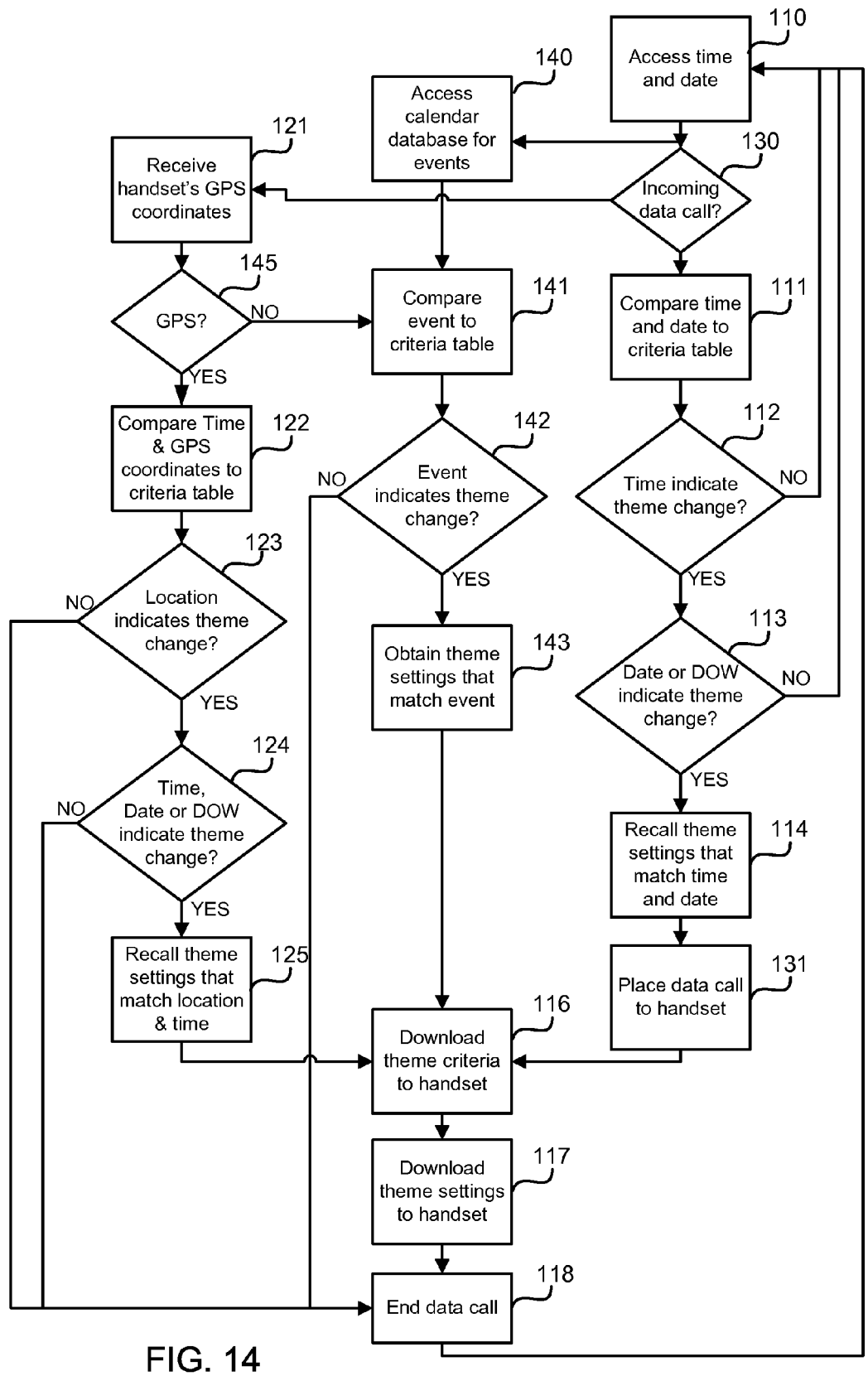
FIG. 14 is a process flow diagram of another embodiment method suitable for implementation on a theme server.
Figure 15:
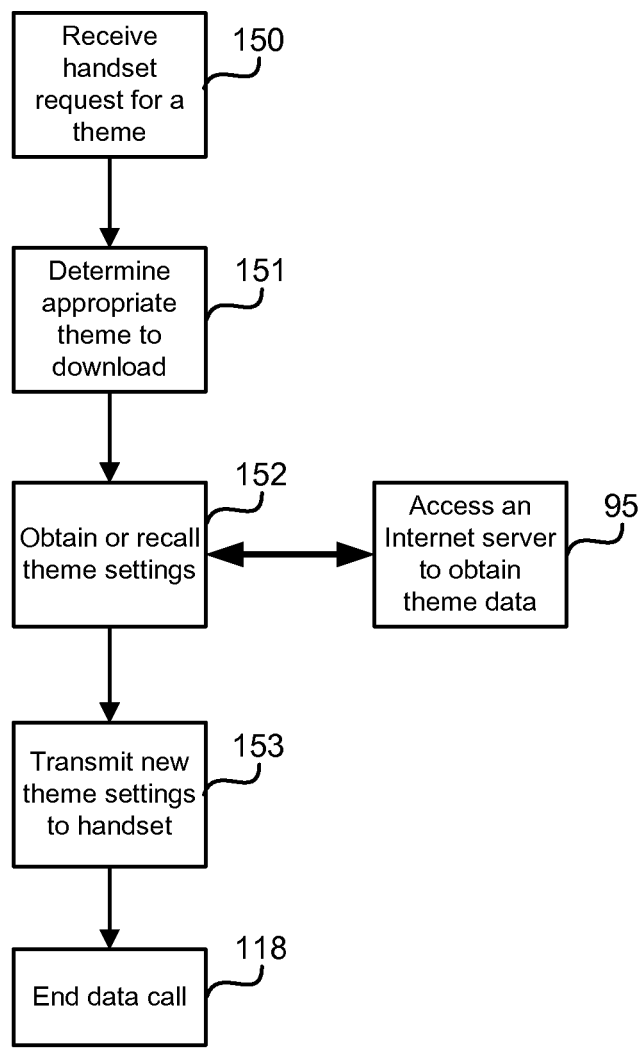
FIG. 15 is a process flow diagram of another embodiment method suitable for implementation on a theme server.

The theme server 204 includes a programmable processor coupled to a data storage medium (not separately shown) as is common in commercially available servers. The data storage medium may be an internal hard disc and/or an external large capacity disc drive which are well known and commercially available (i.e., the term "data storage medium" encompasses both internal and external storage capacity coupled to the server). The theme server 204 may have stored on the data storage medium an extensive data base of mobile handset themes, including images formatted to be wallpaper, and audio files configured to serve as ring tones. The theme server 204 may also be further configured with software that causes the server 204 to receive theme data requests from a mobile handset 190 as illustrated in FIGS. 14 and 15. Software used to configure the theme server 204 to perform the various embodiment methods may be stored in the server memory and/or other tangible server-readable memory, such as a compact disc 208. The theme server 204 may also be configured with network connections and modems as well as software in order to be able to send to, and receive data from, mobile handsets 190 via a network, such as the Internet 202 a wireless (e.g., WiFi) network, and/or via data calls via the cellular telephone network 200.

The foregoing embodiments enable a wide variety of practical applications. As discussed above, users are able to further customize their mobile handsets to implement time, place, date and event appropriate themes. Additionally, businesses and institutions may provide location specific themes, such as maps to their facilities, hours of operation, coupons and other advertisements, to attract customers who happen to be close by. Music producers and publicity companies may update themes to reflect recent images and recordings of actors and recording artists. Companies can provide employees with useful information and speed dial settings via the themes implemented on their company-supplied handsets. Museums, historical sites and amusement parks may provide self-guided walking tours by downloading location-specific themes (particularly wallpapers) which activate based upon the mobile handset's geographic coordinates. Cruise ship and resort operators may update guests on event schedules and provide speed dial settings to reach key services (e.g., room service).

As a further example, government institutions (e.g., the Federal Emergency Management Agency (FEMA)) may transmit themes to those emergency responders and service providers involved in a particular situation to provide those involved with useful information and a set of speed dial settings. For example, FEMA could transmit a theme to selected emergency responders which sets speed dials settings to match the particular situation (e.g., "1" is configured for the cellphone of the on-scene commander whose, "2" is configured for the ad hoc command center, "3" is configured for the hospital designated to receive victims, etc.). In this manner, emergency responders need only hit the standard speed dial number to reach a particular person or organization without having to write down or memorize new telephone numbers for each situation. Also, since the themes are directed to individual handsets, different themes could be downloaded to different emergency response teams providing each team with its own individually tailored speed dial settings.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A mobile handset capable of being configured with a theme, comprising:
   a memory; and
   a processor coupled to the memory, wherein the processor is configured with software to:
   set a calendar event alarm associated with a calendar event in a calendar application, wherein the calendar event alarm includes a user indication that a theme change is required;
   receive the calendar event alarm from the calendar application;
   access a theme server via a wireless data link in response to receiving the calendar event alarm from the calendar application;
   transmit the calendar event to the theme server via the wireless data link;
   receive a theme data record from the theme server via the wireless data link, wherein the theme data record is selected by the theme server based at least in part on the calendar event; and
   change the theme implemented on the mobile handset using the received theme data record.

2. A method for changing a theme on a mobile handset, comprising:
   setting a calendar event alarm associated with a calendar event in a calendar application, wherein the calendar event alarm includes a user indication that a theme change is required;
   receiving the calendar event alarm from the calendar application;
   accessing a theme server via a wireless data link in response to receiving the calendar event alarm from the calendar application;
   transmitting the calendar event to the theme server via the wireless data link;
   determining an appropriate theme data record based at least in part on the calendar event;
   accessing the theme data record;
   receiving the theme data record from the theme server via the wireless data link; and
   changing the theme implemented on the mobile handset using the received theme data record.

3. A mobile handset, comprising:

means for setting a calendar event alarm associated with a calendar event in a calendar application, wherein the calendar event alarm includes a user indication that a theme change is required;

means for receiving the calendar event alarm from the calendar application;

means for accessing a theme server via a wireless data link in response to receiving the calendar event alarm from the calendar application;

means for transmitting the calendar event to the theme server via the wireless data link;

means for receiving a theme data record from the theme server via the wireless data link, wherein the theme data record is selected by the theme server based at least in part on the calendar event; and means for changing the theme implemented on the mobile handset using the received theme data record.

4. A non-transitory processor readable storage medium having stored thereon processor executable software instructions configured to cause a mobile handset processor to perform steps comprising:

setting a calendar event alarm associated with a calendar event in a calendar application, wherein the calendar event alarm includes a user indication that a theme change is required;

receiving the calendar event alarm from the calendar application;

accessing a theme server via a wireless data link in response to receiving the calendar event alarm from the calendar application;

transmitting the calendar event to the theme server via the wireless data link;

receiving a theme data record from the theme server via the wireless data link, wherein the theme data record is selected by the theme server based at least in part on the calendar event; and changing the theme implemented on the mobile handset using the received theme data record.

5. A server configured to receive and transmit data via a network, comprising:

a server memory having stored thereon a plurality of theme data records; and a server processor coupled to the server memory and configured to send data to and receive data from at least one mobile handset, wherein the server processor is configured with software to perform steps comprising:

receiving a calendar event from the at least one mobile handset;

determining that one of the plurality of theme data records should be downloaded to the at least one mobile handset based at least in part on the calendar event;

obtaining the one of the plurality of theme data records to be downloaded to the at least one mobile handset; and downloading the one of the plurality of theme data records to the at least one mobile handset.

6. The server of claim 5, wherein the server is further configured with software to perform steps comprising establishing a data link to the at least one mobile handset prior to downloading the one of the plurality of theme data records to the at least one mobile handset.

7. The server of claim 5, wherein the server is further configured with software to perform steps comprising accessing theme data records stored on another server via the Internet.

8. The server of claim 5, wherein the downloaded one of the plurality of theme data records includes a speed dial configuration.

9. A method for providing theme data to a mobile handset, comprising:

receiving a calendar event from the mobile handset in response to a calendar event alarm at the mobile handset including a user indication that a theme change is required;

determining that one of a plurality of theme data records should be downloaded to the mobile handset based at least in part on the calendar event;

obtaining the one of the plurality of theme data records to be downloaded to the mobile handset; and downloading the one of the plurality of theme data records to the mobile handset.

10. The method of claim 9, further comprising establishing a data link to the mobile handset prior to downloading the one of the plurality of theme data records to the mobile handset.

11. The method of claim 9, further comprising accessing theme data records stored on another server via the Internet.

12. The method of claim 9, wherein the downloaded one of the plurality of theme data records includes a speed dial configuration.

13. A server for providing theme data to a mobile handset, comprising:

means for receiving a calendar event from the mobile handset in response to a calendar event alarm at the mobile handset including a user indication that a theme change is required;

means for determining that one of a plurality of theme data records should be downloaded to the mobile handset based at least in part on the calendar event;

means for obtaining the one of the plurality of theme data records to be downloaded to the mobile handset; and means for downloading the one of the plurality of theme data records to the mobile handset.

14. The server of claim 13, further comprising means for establishing a data link to the mobile handset prior to downloading the one of the plurality of theme data records to the mobile handset.

15. The server of claim 13, further comprising means for accessing theme data records stored on another server via the Internet.

16. The server of claim 13, wherein the downloaded one of the plurality of theme data records includes a speed dial configuration.

17. A non-transitory processor readable storage medium having stored therein processor executable software instructions configured to cause a server processor to perform steps comprising:

receiving a calendar event from the mobile handset in response to a calendar event alarm at least one mobile handset including a user indication that a theme change is required;

determining that one of a plurality of theme data records should be downloaded to the at least one mobile handset based at least in part on the calendar event;

obtaining the one of the plurality of theme data records to be downloaded to the at least one mobile handset; and downloading the one of the plurality of theme data records to the at least one mobile handset.

18. The non-transitory processor readable storage medium of claim 17, wherein the stored server executable software instructions are further configured to cause a server processor to perform steps comprising establishing a data link to the at least one mobile handset prior to downloading the one of the plurality of theme data records to the at least one mobile handset.

19. The non-transitory processor readable storage medium of claim 17, wherein the stored server executable software instructions are further configured to cause a server processor to perform steps comprising accessing theme data records stored on another server via the Internet.

20. The non-transitory processor readable storage medium of claim 17, wherein the downloaded one of the plurality of theme data records includes a speed dial configuration.

21. A system, comprising:
a wireless communication system;
a mobile handset configured to communicate via the wireless communication system; and
a server configured to communicate via the wireless communication system, wherein the server comprises:
  a server memory having stored thereon a plurality of additional theme data records; and
  a server processor coupled to the server memory and configured to send data to and receive data from the mobile handset, wherein the server processor is configured with software to perform steps comprising:
    receiving a calendar event from the mobile handset via the wireless network;
    determining that one of the plurality of additional theme data records should be downloaded to the mobile handset based at least in part on the calendar event;
    obtaining the one of the plurality of additional theme data records to be downloaded; and
    downloading the one of the plurality of additional theme data records to the mobile handset via the wireless network, and
wherein the mobile handset comprises:
  a mobile handset memory having stored therein a plurality of theme data records; and
  a mobile handset processor coupled to the mobile handset memory, wherein the mobile handset processor is configured with software to perform steps comprising:
    setting a calendar event alarm associated with a calendar event in a calendar application, wherein the calendar event alarm includes a user indication that a theme change is required;
    receiving the calendar event alarm from the calendar application;
    transmitting the calendar event to the theme server via the wireless network
    receiving the downloaded one of the plurality of additional theme data records via the wireless network;
    storing the received downloaded one of the plurality of additional theme data records in a data file of theme data records stored in the mobile handset memory; and
    using the downloaded one of the plurality of additional theme data records stored in the mobile handset memory to change the theme implemented on the mobile handset.

* * * * *